United States Patent
Icho et al.

(10) Patent No.: US 9,438,651 B2
(45) Date of Patent: Sep. 6, 2016

(54) CONTENT DISPLAY METHOD, PROGRAM, AND CONTENT DISPLAY SYSTEM

(71) Applicant: Panasonic Intellectual Property Corporation of America, Torrance, CA (US)

(72) Inventors: Keiji Icho, Osaka (JP); Kento Ogawa, Osaka (JP); Shingo Miyamoto, Hyogo (JP); Ryouichi Kawanishi, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/647,990

(22) PCT Filed: Apr. 16, 2014

(86) PCT No.: PCT/JP2014/002172
§ 371 (c)(1),
(2) Date: May 28, 2015

(87) PCT Pub. No.: WO2014/171143
PCT Pub. Date: Oct. 23, 2014

(65) Prior Publication Data
US 2015/0312288 A1    Oct. 29, 2015

(30) Foreign Application Priority Data

Apr. 16, 2013  (JP) ................................ 2013-085615
Dec. 27, 2013  (JP) ................................ 2013-273378

(51) Int. Cl.
*G06F 15/16*       (2006.01)
*H04L 29/06*       (2006.01)
(Continued)

(52) U.S. Cl.
CPC ............. *H04L 65/403* (2013.01); *G06F 3/048* (2013.01); *G06F 13/00* (2013.01); *H04L 63/08* (2013.01); *H04L 67/10* (2013.01); *H04N 21/431* (2013.01)

(58) Field of Classification Search
CPC .... G06F 17/3015–17/30162; G06F 17/30011; G06F 17/3005; G06F 17/30106–17/30112; H04N 21/431–21/438
See application file for complete search history.

(56) References Cited

U.S. PATENT DOCUMENTS

2006/0087987 A1* 4/2006 Witt ................. G06F 17/30017
                                                      370/260
2006/0184972 A1* 8/2006 Rafey .................... G06F 21/10
                                                        725/80

(Continued)

FOREIGN PATENT DOCUMENTS

JP          2005-84886       3/2005
JP          2005-260842      9/2005

(Continued)

OTHER PUBLICATIONS

International Search Report issued Jul. 22, 2014 in International (PCT) Application No. PCT/JP2014/002172.

(Continued)

*Primary Examiner* — Brendan Higa
(74) *Attorney, Agent, or Firm* — Wenderoth, Lind & Ponack, L.L.P.

(57) ABSTRACT

A content information access control unit (107) displays terminal content (301 to 315), which is stored in a storage terminal owned by a user, on a display unit, displays a sharing mark (213), which represents a sharing service used to share content, on the display unit in association with shared content that has been shared on the sharing service, among the terminal content displayed on the display unit, and displays a terminal mark (214) representing the storage terminal on the display unit in association with the terminal content displayed on the display unit.

12 Claims, 16 Drawing Sheets

(51) Int. Cl.
*G06F 13/00* (2006.01)
*G06F 3/048* (2013.01)
*H04L 29/08* (2006.01)
*H04N 21/431* (2011.01)

(56) References Cited

U.S. PATENT DOCUMENTS

| | | | |
|---|---|---|---|
| 2007/0033225 A1* | 2/2007 | Davis | H04N 21/4332 |
| 2007/0038647 A1* | 2/2007 | Thomas | H04N 21/4332 |
| 2009/0282050 A1* | 11/2009 | Thomas | G06F 17/30194 |
| 2009/0282078 A1* | 11/2009 | Thomas | G06F 17/30058 |
| 2009/0282088 A1* | 11/2009 | Thomas | H04L 67/02 |
| 2011/0225156 A1* | 9/2011 | Pavlik | G06F 17/30038 |
| | | | 707/737 |
| 2012/0188384 A1 | 7/2012 | Mukai et al. | |
| 2013/0182131 A1 | 7/2013 | Naono | |
| 2013/0238777 A1* | 9/2013 | Raleigh | H04L 67/1097 |
| | | | 709/223 |
| 2014/0053212 A1* | 2/2014 | Shoykher | H04N 5/44 |
| | | | 725/59 |
| 2015/0104114 A1* | 4/2015 | Bai | G06F 17/3028 |
| | | | 382/284 |

FOREIGN PATENT DOCUMENTS

| | | |
|---|---|---|
| JP | 4717963 | 7/2011 |
| JP | 2012-170056 | 9/2012 |

OTHER PUBLICATIONS

Written Opinion of the International Searching Authority issued Jul. 22, 2014 in International (PCT) Application No. PCT/JP2014/002172.

\* cited by examiner

FIG. 14

| TERMINAL CONTENT ID | FIRST SNS | | SECOND SNS | | THIRD SNS | |
|---|---|---|---|---|---|---|
| | FAVORABILITY RATING | NUMBER OF COMMENTS | FAVORABILITY RATING | NUMBER OF COMMENTS | FAVORABILITY RATING | NUMBER OF COMMENTS |
| TC00101 | 2 | 4 | – | – | – | – |
| TC00102 | 2 | 0 | 3 | 2 | – | – |
| TC00103 | – | – | – | – | 5 | 4 |
| TC00104 | – | – | – | – | – | – |

206

CONTENT DISPLAY METHOD, PROGRAM, AND CONTENT DISPLAY SYSTEM

TECHNICAL FIELD

The present invention relates to a content display method, a program, and a content display system for displaying content.

BACKGROUND ART

In recent years, mobile terminals, tablets, and the like have become more popular, storage media have increased in storage capacity, and network services have expanded. As a result, opportunities for capturing, storing, and sharing content such as photographs and moving images have increased. For example, registered users of sharing services such as social networking services share content captured by themselves on the sharing service via a network.

Several techniques for managing content captured on an image capturing terminal using a network have been proposed in the prior art. For example, unique information may be attached to the content in the terminal, and the unique information may be managed in association with additional information added to the content in a server so that the content can be displayed on another terminal (see Patent Literature 1). Further, content managed by a server may be manipulated in a terminal so that the content can be moved to another service (see Patent Literature 2).

However, these conventional techniques require further improvement.

CITATION LIST

Patent Literature

Patent Literature 1: Japanese Unexamined Patent Publication No. 2005-260842
Patent Literature 2: Japanese Patent Publication No. 4717963

SUMMARY OF INVENTION

The present invention has been designed in order to solve this problem, and an object thereof is to provide a content display method, a program, and a content display system with which content shared on a sharing service can be viewed easily by a user.

A content display method according to an aspect of the present invention includes: a first display step of displaying on a display unit terminal content stored in a storage terminal owned by a user; a second display step of displaying sharing service identification information, which is information identifying a sharing service used to share content, on the display unit in association with shared content, which is content that has been shared on the sharing service among the terminal content displayed on the display unit; and a third display step of displaying terminal identification information, which is information identifying the storage terminal, on the display unit in association with the terminal content displayed on the display unit.

BRIEF DESCRIPTION OF DRAWINGS

FIG. 14 is a view showing an example of an evaluation information table created according to a third embodiment.

DESCRIPTION OF EMBODIMENTS

Figure 1:
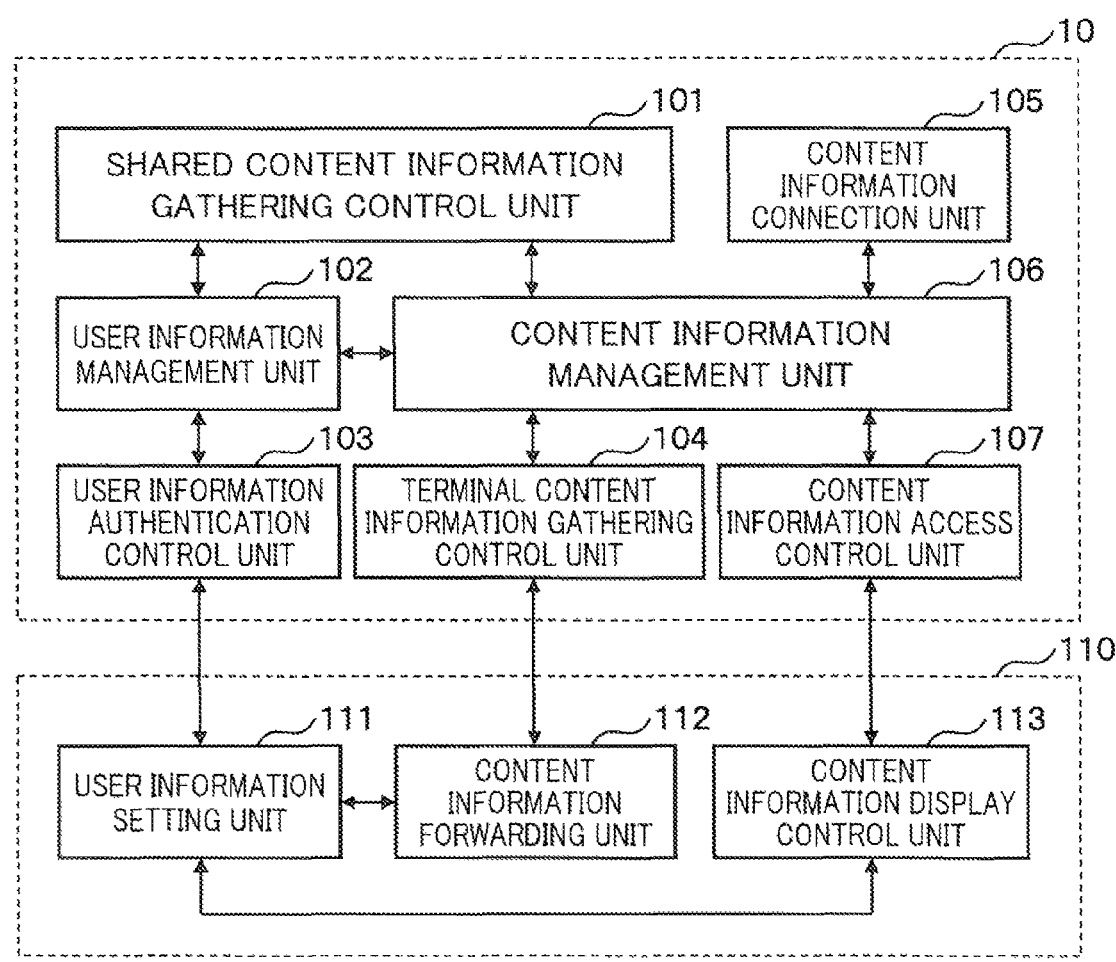
FIG. 1 is a schematic view showing an example of function blocks of a server and a terminal according to a first embodiment.

Processes Leading to Development of Embodiments of the Present Invention

The present inventors conducted detailed investigations into methods of displaying content before and after the content is shared to a sharing service such as that described above. First, a user shares all or a part of content stored on a terminal to the sharing service using a general browser or one of various terminal applications. Content management is typically performed individually by each of various sharing services. Therefore, when the content stored in the terminal owned by the user and the content shared by the user on the sharing service are displayed on a display terminal owned by the user, the content is displayed separately in different windows or the like, for example.

However, when the content shared on the sharing service and the source content stored in the terminal are displayed separately, despite being identical, the user must switch between the windows or the like, for example, in order to view the content, and as a result, the user is inconvenienced.

Hence, the present inventors arrived at the inventions according to the aspects described below, with which content shared on a sharing service can be viewed by a user easily.

A content display method according to an aspect of the present invention includes: a first display step of displaying terminal content stored on a storage terminal owned by a user on a display unit; a second display step of displaying sharing service identification information, which is information identifying a sharing service used to share content, on the display unit in association with shared content, which is content that has been shared on the sharing service among the terminal content displayed on the display unit; and a third display step of displaying terminal identification information, which is information identifying the storage terminal, on the display unit in association with the terminal content displayed on the display unit.

According to this configuration, the terminal content stored in the storage terminal owned by the user is displayed on the display unit in the first display step. In the second display step, the sharing service identification information identifying the sharing service used to share the content is displayed on the display unit in association with the shared content that has been shared on the sharing service, among the terminal content displayed on the display unit. In the third display step, the terminal identification information identifying the storage terminal is displayed on the display unit in association with the terminal content displayed on the display unit.

Hence, when the user views the content displayed on the display unit, the user can identify the storage terminal on which the content is stored from the terminal identification information. Further, when the user views the content displayed on the display unit, the user can identify the content that has been shared on the sharing service by him/herself in the past, among the displayed content, as well as the sharing service on which the content was shared, from the sharing identification information.

The content display method may further include: a sharing information storage step of obtaining the shared content from the sharing service using authentication information employed by the user to use the sharing service, and storing the obtained shared content in a storage unit in association with the sharing service identification information; and a connection step of creating sharing match information expressing a matching relationship between terminal content that matches the shared content, among the terminal content displayed on the display unit, and the matching shared content, and storing the created sharing match information in the storage unit, and in the second display step, the terminal content that matches the shared content may be specified on the basis of the sharing match information, and the sharing service identification information may be displayed on the display unit in association with the specified terminal content.

According to this configuration, in the sharing information storage step, the shared content is obtained from the sharing service using the authentication information employed by the user to use the sharing service. In the sharing information storage step, the obtained shared content is stored in the storage unit in association with the sharing service identification information. In the connection step, the sharing match information expressing the matching relationship between the terminal content that matches the shared content, among the terminal content displayed on the display unit, and the matching shared content is created. In the connection step, the created sharing match information is stored in the storage unit. In the second display step, the terminal content that matches the shared content is specified on the basis of the sharing match information. In the second display step, the sharing service identification information is displayed on the display unit in association with the specified terminal content. As a result, the sharing service identification information can be displayed on the display unit in association with the terminal content shared on the sharing service.

The content display method may further include a terminal information storage step of obtaining the terminal content from the storage terminal and storing the obtained terminal content in the storage unit in association with the terminal identification information. Further, when the shared content is stored in the storage unit in the sharing information storage step, shared content identification information specifying the shared content may be attached to the shared content and the attached shared content identification information may be stored in the storage unit in association with the sharing service identification information, when the terminal content is stored in the storage unit in the terminal information storage step, terminal content identification information specifying the terminal content may be attached to the terminal content and the attached terminal content identification information may be stored in the storage unit in association with the terminal identification information, and in the connection step, a matching shared content correspondence table on which the terminal content identification information attached to the terminal content is associated with the shared content identification information attached to the shared content that matches the terminal content may be created as the sharing match information.

According to this configuration, in the terminal information storage step, the terminal content is obtained from the storage terminal. In the terminal information storage step, the obtained terminal content is stored in the storage unit in association with the terminal identification information. In the sharing information storage step, when the shared content is stored in the storage unit, the shared content identification information specifying the shared content is attached to the shared content. In the shared information storage step, the attached shared content identification information is stored in the storage unit in association with the sharing service identification information. In the terminal information storage step, when the terminal content is stored in the storage unit, the terminal content identification information specifying the terminal content is attached to the terminal content. In the terminal information storage step, the attached terminal content identification information is stored in the storage unit in association with the terminal identification information. In the connection step, the matching shared content correspondence table on which the terminal content identification information attached to the terminal content is associated with the shared content identification information attached to the shared content that matches the terminal content is created as the sharing match information. As a result, the shared content that matches the terminal content can be determined from the matching shared content correspondence table.

According to the content display method, in the terminal information storage step, when the terminal content is obtained from a first terminal serving as the storage terminal, the obtained terminal content may be stored in the storage unit in association with first terminal identification information identifying the first terminal, and when the terminal content is obtained from a second terminal serving as the storage terminal, the second terminal being different to the first terminal, the obtained terminal content may be stored in the storage unit in association with second terminal identification information identifying the second terminal. Further, in the connection step, terminal match information expressing a matching relationship of matching terminal content between the terminal content stored in the storage unit in association with the first terminal identification information and the terminal content stored in the storage unit in association with the second terminal identification information may also be created, whereupon the created terminal match information may be stored in the storage unit, and in the third display step, the matching terminal content may be specified on the basis of the terminal match information, whereupon the first terminal identification information and the second terminal identification information may be displayed on the display unit in association with the specified terminal content.

According to this configuration, when the terminal content is obtained from the first terminal serving as the storage terminal in the terminal information storage step, the obtained terminal content is stored in the storage unit in association with the first terminal identification information identifying the first terminal. Further, in the terminal information storage step, when the terminal content is obtained from the second terminal serving as the storage terminal, the second terminal being different to the first terminal, the obtained terminal content is stored in the storage unit in association with the second terminal identification information identifying the second terminal. In the connection step, the terminal match information expressing the matching relationship of the matching terminal content between the terminal content stored in the storage unit in association with the first terminal identification information and the terminal content stored in the storage unit in association with the second terminal identification information is also created. In the connection step, the created terminal match information is stored in the storage unit. In the third display step, the matching terminal content is specified on the basis of the terminal match information. In the third display step, the first terminal identification information and the second terminal identification information are displayed on the display unit in association with the specified terminal content. Hence, when the user views the terminal content displayed on the display unit, the user can determine from the first terminal identification information and the second terminal identification information that the terminal content is stored in the first terminal and the second terminal.

According to the content display method, in the third display step, information stored in the storage unit latterly, among the first terminal identification information and the second terminal identification information, may be displayed on the display unit in a larger size than information stored in the storage unit initially.

According to this configuration, in the third display step, the information stored in the storage unit latterly, among the first terminal identification information and the second terminal identification information, is displayed on the display unit in a larger size than the information stored in the storage unit initially. Hence, when the user views the content displayed on the display unit, the user can determine a storage destination history of the terminal content from the respective sizes of the first terminal identification information and the second terminal identification information.

According to the content display method, in the terminal information storage step, when the terminal content is obtained from a first terminal serving as the storage terminal, the obtained terminal content may be stored in the storage unit in association with first terminal identification information identifying the first terminal, and when the terminal content is obtained from a second terminal serving as the storage terminal, the second terminal being different to the first terminal, the obtained terminal content may be stored in the storage unit in association with second terminal identification information identifying the second terminal. Further, in the connection step, terminal match information expressing a matching relationship of matching terminal content between the terminal content stored in the storage unit in association with the first terminal identification information and the terminal content stored in the storage unit in association with the second terminal identification information may also be created, whereupon the created terminal match information may be stored in the storage unit, and in the third display step, the matching terminal content may be specified on the basis of the terminal match information, whereupon information stored in the storage unit latterly, among the first terminal identification information and the second terminal identification information, may be displayed on the display unit in association with the specified terminal content.

According to this configuration, when the terminal content is obtained from the first terminal serving as the storage terminal in the terminal information storage step, the obtained terminal content is stored in the storage unit in association with the first terminal identification information identifying the first terminal, and when the terminal content is obtained from the second terminal serving as the storage terminal, the second terminal being different to the first terminal, the obtained terminal content is stored in the storage unit in association with the second terminal identification information identifying the second terminal. In the connection step, the terminal match information expressing the matching relationship of the matching terminal content between the terminal content stored in the storage unit in association with the first terminal identification information and the terminal content stored in the storage unit in association with the second terminal identification information is also created. In the connection step, the created terminal match information is stored in the storage unit. In the third display step, the matching terminal content is specified on the basis of the terminal match information, and the information stored in the storage unit latterly, among the first terminal identification information and the second terminal identification information, is displayed on the display unit in association with the specified terminal content. Hence, when the user views the content displayed on the display unit, the user can identify the storage terminal on which the content was stored most recently from the displays terminal identification information.

According to the content display method, when the terminal content is stored in the storage unit in the terminal information storage step, terminal content identification information specifying the terminal content may be attached to the terminal content, whereupon the attached terminal content identification information may be stored in the storage unit in association with the terminal identification information, and in the connection step, a matching terminal content correspondence table associating the terminal content identification information attached to the matching terminal content may be created as the terminal match information.

According to this configuration, when the terminal content is stored in the storage unit in the terminal information storage step, the terminal content identification information specifying the terminal content is attached to the terminal content. In the terminal information storage step, the attached terminal content identification information is stored in the storage unit in association with the terminal identification information. In the connection step, the matching terminal content correspondence table associating the terminal content identification information attached to the matching terminal content is created as the terminal match information. As a result, matching terminal content can be determined from the matching terminal content correspondence table.

According to the content display method, when the terminal content is stored in the storage unit in the terminal information storage step, terminal content identification information specifying the terminal content may be attached to the terminal content, the attached terminal content identification information may be stored in the storage unit in association with the terminal identification information, and in a case where the terminal content is deleted from the storage terminal from which the terminal content was obtained, the terminal identification information stored in the storage unit in association with the terminal content identification information may be deleted from the storage unit, and in the third display step, the deleted terminal identification information may be prevented from being displayed on the display unit in association with the terminal content corresponding to the terminal content identification information that is stored in the storage unit in association with the deleted terminal identification information.

According to this configuration, when the terminal content is stored in the storage unit in the terminal information storage step, the terminal content identification information specifying the terminal content is attached to the terminal content. In the terminal information storage step, the attached terminal content identification information is stored in the storage unit in association with the terminal identification information. Further, in the terminal information storage step, in a case where the terminal content is deleted from the storage terminal from which the terminal content was obtained, the terminal identification information stored in the storage unit in association with the terminal content identification information is deleted from the storage unit. In the third display step, the deleted terminal identification information is not displayed on the display unit in association with the terminal content corresponding to the terminal content identification information that is stored in the storage unit in association with the deleted terminal identification information.

Hence, the terminal identification information associated with content that has been deleted from the storage terminal is deleted. Accordingly, the terminal identification information is not displayed on the display unit in the third display step. As a result, when the user views the content displayed on the display unit, the user can confirm that content for which no terminal identification information is displayed has been deleted from the storage terminal.

A content display method according to another aspect of the present invention includes: a first display step of displaying terminal content stored on a storage terminal owned by a user on a display unit; a sharing information storage step of obtaining shared content, which is content among the terminal content displayed on the display unit that has been shared on a sharing service used to share content, from the sharing service using authentication information employed by the user to use the sharing service, and storing the obtained shared content in a storage unit in association with sharing service identification information identifying the sharing service; and a second display step of displaying the sharing service identification information on the display unit in association with the shared content among the terminal content displayed on the display unit.

According to this configuration, in the first display step, the terminal content stored in the storage terminal owned by the user is displayed on the display unit. In the sharing information storage step, the shared content, which is the content among the terminal content displayed on the display unit that has been shared on the sharing service used to share content, is obtained from the sharing service using the authentication information employed by the user to use the sharing service. In the sharing information storage step, the obtained shared content is stored in the storage unit in association with the sharing service identification information identifying the sharing service. In the second display step, the sharing service identification information is displayed on the display unit in association with the shared content among the terminal content displayed on the display unit. Hence, when the user views the content displayed on the display unit, the user can identify content that has been shared by him/herself in the past on the sharing service, among the displayed content, as well as the sharing service on which the content was shared, from the sharing service identification information.

According to the content display method, when the shared content is obtained from the sharing service in the sharing information storage step, evaluation information representing an evaluation applied to the shared content may also be obtained from the sharing service, whereupon the obtained evaluation information may be stored in the storage unit in association with the obtained shared content, and in the first display step, the shared content may be displayed on the display unit on the basis of the evaluation information such that the shared content having a high evaluation is displayed in a larger size than the shared content having a low evaluation.

According to this configuration, when the shared content is obtained from the sharing service in the sharing information storage step, the evaluation information representing the evaluation applied to the shared content is also obtained from the sharing service. In the sharing information storage step, the obtained evaluation information is stored in the storage unit in association with the obtained shared content. In the first display step, the shared content is displayed on the display unit on the basis of the evaluation information such that the shared content having a high evaluation is displayed in a larger size than the shared content having a low evaluation. Hence, when the user views the content displayed on the display unit, the user can determine the evaluation applied to the shared content from the size of the content.

According to the content display method, when the shared content is stored in the storage unit in the sharing information storage step, shared content identification information specifying the shared content may be attached to the shared content, the attached shared content identification information may be stored in the storage unit in association with the sharing identification information, and in a case where the shared content is deleted from the sharing service from which the shared content was obtained, the sharing identification information stored in the storage unit in association with the shared content identification information may be deleted from the storage unit, and in the second display step, the deleted sharing identification information may be prevented from being displayed on the display unit in association with the shared content corresponding to the shared content identification information that is stored in the storage unit in association with the deleted sharing identification information.

According to this configuration, when the shared content is stored in the storage unit in the sharing information storage step, the shared content identification information specifying the shared content is attached to the shared content. In the sharing information storage step, the attached shared content identification information is stored in the storage unit in association with the sharing identification information. Further, in the sharing information storage step, in a case where the shared content is deleted from the sharing service from which the shared content was obtained, the sharing identification information stored in the storage unit in association with the shared content identification information is deleted from the storage unit. In the second display step, the deleted sharing identification information is not displayed on the display unit in association with the shared content corresponding to the shared content identification information that is stored in the storage unit in association with the deleted sharing identification information.

Hence, the sharing identification information associated with content that has been deleted from the storage terminal is deleted. Accordingly, the terminal identification information is not displayed on the display unit in the second display step. As a result, when the user views the content displayed on the display unit, the user can confirm that content for which no sharing identification information is displayed has been deleted from the sharing service.

A program according to a further aspect of the present invention controls a content display system comprising a display unit, wherein the program causes a computer of the content display system to execute: a first display step of displaying terminal content stored on a storage terminal owned by a user on the display unit; a second display step of displaying sharing service identification information, which is information identifying a sharing service used to share content, on the display unit in association with shared content, which is content that has been shared on the sharing service among the terminal content displayed on the display unit; and a third display step of displaying terminal identification information, which is information identifying the storage terminal, on the display unit in association with the terminal content displayed on the display unit.

According to this configuration, in the first display step, the terminal content stored in the storage terminal owned by the user is displayed on the display unit. In the second display step, the sharing service identification information identifying the sharing service used to share content is displayed on the display unit in association with the shared content that has been shared on the sharing service, among the terminal content displayed on the display unit. In the third display step, the terminal identification information identifying the storage terminal is displayed on the display unit in association with the terminal content displayed on the display unit.

Hence, when the user views the content displayed on the display unit, the user can identify the storage terminal on which the content is stored from the terminal identification information. Further, when the user views the content displayed on the display unit, the user can identify content that has been shared on the sharing service by him/herself in the past, among the displayed content, as well as the sharing service on which the content was shared, from the sharing identification information.

A content display system according to a further aspect of the present invention includes: a storage terminal owned by a user; a display unit; and a control unit for displaying terminal content stored in the storage terminal on the display unit, wherein the control unit is further configured to: display sharing service identification information, which is information identifying a sharing service used to share content, on the display unit in association with shared content, which is content that has been shared on the sharing service among the terminal content displayed on the display unit; and display terminal identification information, which is information identifying the storage terminal, on the display unit in association with the terminal content displayed on the display unit.

According to this configuration, the control unit displays the sharing service identification information identifying the sharing service used to share content on the display unit in association with the shared content that has been shared on the sharing service, among the terminal content displayed on the display unit. Further, the control unit displays the terminal identification information identifying the storage terminal on the display unit in association with the terminal content displayed on the display unit. Hence, when the user views the content displayed on the display unit, the user can identify the storage terminal storing the content from the terminal identification information. Furthermore, when the user views the content displayed on the display unit, the user can identify content that has been shared on the sharing service by him/herself in the past, among the displayed content, as well as the sharing service on which the content was shared, from the sharing identification information.

Embodiments of the present invention will be described below with reference to the drawings. Note that the following embodiments are specific examples of the present invention, and are not intended to limit the technical scope of the present invention.

First Embodiment

Figure 2:
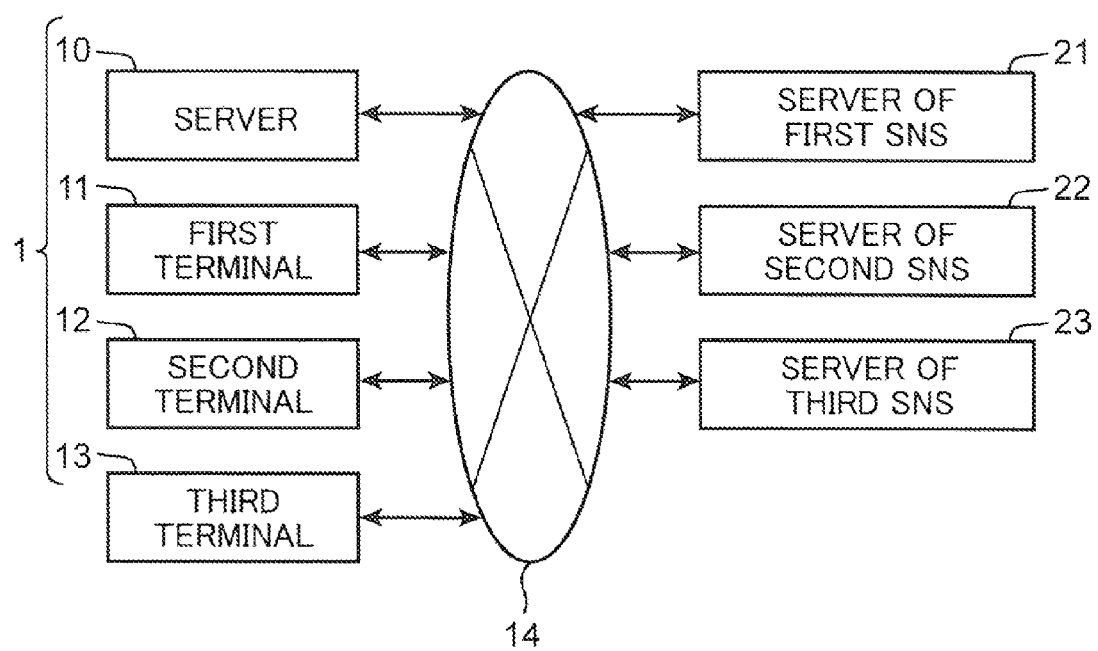
FIG. 2 is a schematic view showing an example of a configuration of a content display control system according to the first embodiment.

FIG. 1 is a schematic view showing an example of function blocks of a server and a terminal according to a first embodiment. FIG. 2 is a schematic view showing an example of a configuration of a content display control system according to the first embodiment.

As shown in FIG. 2, a content display control system 1 includes a server 10, a first terminal 11, a second terminal 12, and a third terminal 13. The server 10, the first terminal 11, the second terminal 12, and the third terminal 13 are respectively connected to a network 14 and configured to be capable of communicating with each other. The first terminal 11, second terminal 12, and third terminal 13 are smartphones, tablets, personal computers (PCs), digital cameras, or the like, for example. Note that in FIG. 2, the content display control system 1 includes three terminals constituted by the first to third terminals 11 to 13, but the content display control system 1 according to the first embodiment may include one, two, four, or more terminals instead.

A server 21 of a first social networking service (referred to hereafter as "SNS"), a server 22 of a second SNS, and a server 23 of a third SNS are also connected to the network 14. The server 10, the first terminal 11, the second terminal 12, and the third terminal 13 are respectively configured to be capable of accessing the servers 21, 22, 23 via the network 14. Note that in FIG. 2, the content display control system 1 includes three SNS servers constituted by the servers 21 to 23 of the first to third SNSs, but the content display control system 1 according to the first embodiment may include one, two, four, or more SNS servers instead.

As shown in FIG. 1, the server 10 includes a shared content information gathering control unit 101, a user information management unit 102, a user information authentication control unit 103, a terminal content information gathering control unit 104, a content information connection unit 105, a content information management unit 106, and a content information access control unit 107.

An application 110 that is downloaded by a user from an application sharing site or the like, for example, and operated while connected to the server 10 via the network 14 operates on the first terminal 11, the second terminal 12, and the third terminal 13. The application 110 includes a user information setting unit 111, a content information forwarding unit 112, and a content information display control unit 113.

When server login information for logging into the server 10 is input by the user during initial registration via a user interface installed in the first terminal 11, the second terminal 12, and the third terminal 13, the user information setting unit 111 transmits the server login information input by the user to the user information authentication control unit 103 provided in the server 10 together with a server login information registration instruction. Note that the server login information includes a user ID and a password, for example. The user information authentication control unit 103 issues server access authentication information required to access the server 10 on the basis of the server login information, and the user information setting unit 111 receives and stores the server access authentication information.

Further, when registered server login information is input by the user during login via the user interface installed in the first terminal 11, the second terminal 12, and the third terminal 13, the user information setting unit 111 transmits the server login information input by the user to the user information authentication control unit 103 provided in the server 10 together with a server login instruction. The user information authentication control unit 103 issues the server access authentication information required to access the server 10 on the basis of the server login information, and the user information setting unit 111 receives and stores the server access authentication information.

Furthermore, when SNS login information for logging into the server 21 of the first SNS, the server 22 of the second SNS, and the server 23 of the third SNS is input by the user via the user interface installed in the first terminal 11, the second terminal 12, and the third terminal 13, the user information setting unit 111 transmits the SNS login information input by the user to the user information authentication control unit 103 provided in the server 10. Note that the SNS login information includes a user ID and a password, for example.

The content information forwarding unit 112 forwards terminal content information stored in the first terminal 11, the second terminal 12, and the third terminal 13 to the terminal content information gathering control unit 104 provided in the server 10 using the server access authentication information required to access the server 10, which is stored in the user information setting unit 111. Here, the terminal content information includes content stored in the terminal, information (a time and a location at which the terminal content was captured, a title of the terminal content, and so on) attached to the terminal content, and so on, for example. Further, when the terminal content information is forwarded, the terminal content information may be compressed or encoded. A forwarding subject area may be constituted by an entire storage area for storing data in the terminal, a storage area for storing content captured by a camera installed in the terminal, a predetermined folder set by the application 110, or a folder specified by the user. Furthermore, the forwarded terminal content information may include all of the terminal content information in the forwarding subject area, terminal content information corresponding to terminal content newly stored in the forwarding subject area, or updated terminal content information in the forwarding subject area. The content information forwarding unit 112 forwards the terminal content information periodically at predetermined times or time intervals, for example. Note that the terminal content information may be forwarded at a different timing such as an activation timing of the application 110, a timing specified by the user, or an update timing of the terminal content information.

The content information display control unit 113 receives content information from the content information access control unit 107 provided in the server 10 by transmitting a content information access request to the content information access control unit 107 using the server access authentication information required to access the server 10, which is stored in the user information setting unit 111, and performs control to display the content information on a display installed in the first terminal 11, the second terminal 12, and the third terminal 13. Here, the content information includes content, information attached to or associated with the content, and so on, for example. Note that the content information display control unit 113 may transmit a condition on which to access the content information to the content information access control unit 107 together with the content information access request.

Shared content shared by the user from the various terminals, information attached to the shared content, and so on are stored in the server 21 of the first SNS, the server 22 of the second SNS, and the server 23 of the third SNS. Here, the information attached to the shared content includes evaluation information (a comment, a favorability rating, or the like) relating to the shared content or the like, for example. Note that the evaluation information will be described below. Further, the server 21 of the first SNS, the server 22 of the second SNS, and the server 23 of the third SNS are configured to be accessible from another server such as the server 10.

Figure 3:
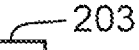
FIG. 3 is a view showing an example of a shared content table created according to the first embodiment.
Figure 4:
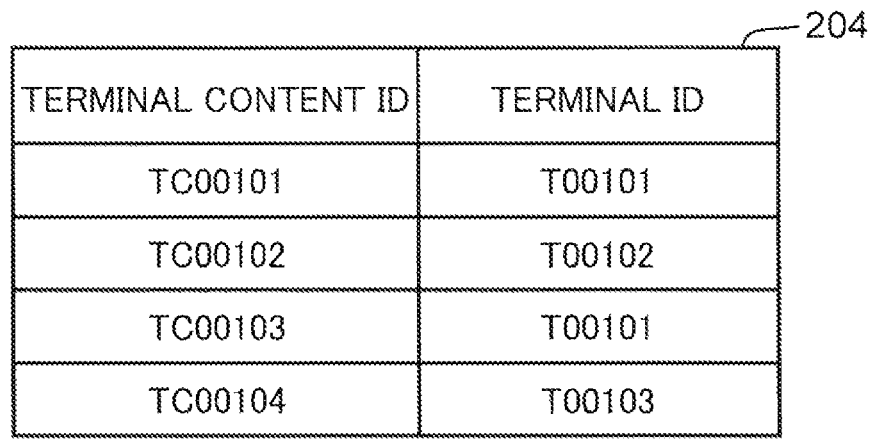
FIG. 4 is a view showing an example of a terminal content table created according to the first embodiment.
Figure 5:
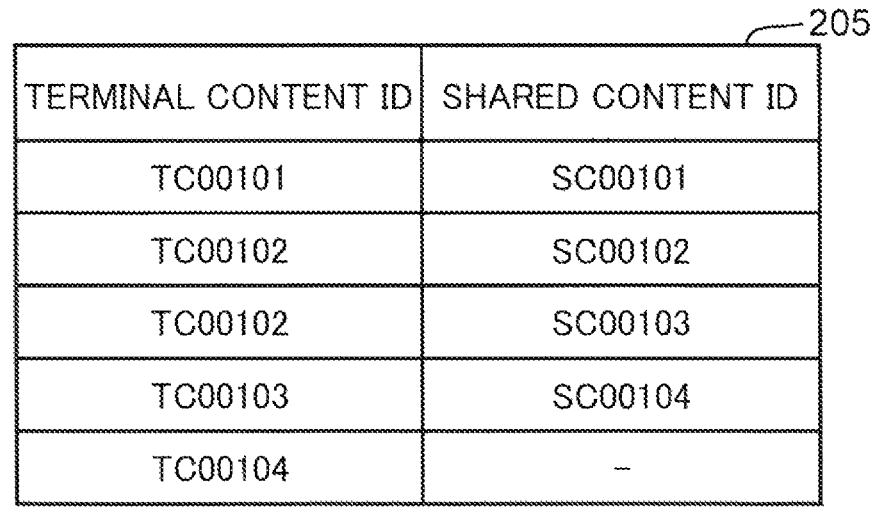
FIG. 5 is a view showing an example of a matching shared content correspondence table created according to the first embodiment.
Figure 6:
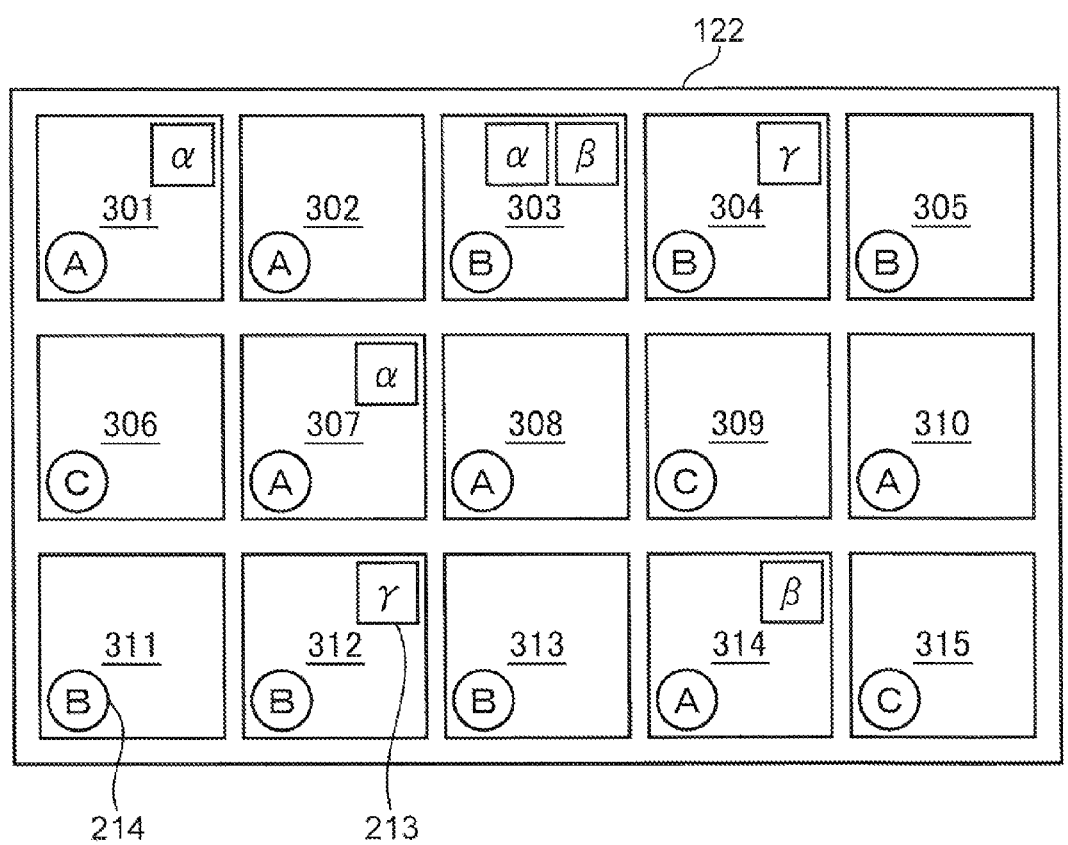
FIG. 6 is a schematic view showing an example of a display of content information that is controlled by a content information display control unit so as to be displayed on a display installed in the terminal, according to the first embodiment.

FIG. 3 is a view showing an example of a shared content table 203 created according to the first embodiment. FIG. 4 is a view showing an example of a terminal content table 204 created according to the first embodiment. FIG. 5 is a view showing an example of a matching shared content correspondence table 205 created according to the first embodiment. FIG. 6 is a view showing an example of a display of content information that is controlled by the content information display control unit 113 so as to be displayed on the display installed in the first terminal 11, the second terminal 12, and the third terminal 13, according to the first embodiment. Functions of various parts of the server 10 will now be described using FIGS. 1 to 6.

During initial registration, the user information authentication control unit 103 receives the server login information registration instruction and the server login information from the user information setting unit 111 of the application 110 operating on the first terminal 11, the second terminal 12, and the third terminal 13. Having received the server login information registration instruction and the server login information, the user information authentication control unit 103 issues the server access authentication information required to access the server 10 on the basis of the received server login information. The user information authentication control unit 103 instructs the user information management unit 102 to register the received server login information and the issued server access authentication information in association with the user ID. The user information authentication control unit 103 then transmits the issued server access authentication information to the user information setting unit 111 serving as the transmission source of the server login information.

Further, during login, the user information authentication control unit 103 receives the server login instruction and the server login information from the user information setting unit 111 of the application 110 operating on the first terminal 11, the second terminal 12, and the third terminal 13. Having received the server login instruction and the server login information, the user information authentication control unit 103 compares the received server login information with the server login information already registered in the user information management unit 102, and when the received server login information matches the registered server login information, issues the server access authentication information required to access the server 10 on the basis of the received server login information. The user information authentication control unit 103 instructs the user information management unit 102 to store the issued server access authentication information in association with the corresponding user ID. The user information authentication control unit 103 then transmits the issued server access authentication information to the user information setting unit 111 serving as the transmission source of the server login information.

Additionally, the user information authentication control unit 103 receives the SNS login information from the user information setting unit 111 of the application 110 operating on the first terminal 11, the second terminal 12, and the third terminal 13. Having received the SNS login information, the user information authentication control unit 103 transmits the received SNS login information to the corresponding server 21, 22, 23 of the first SNS, the second SNS, or the third SNS. The user information authentication control unit 103 receives SNS access authentication information required to access the SNS, which is issued by the server 21 of the first SNS, the server 22 of the second SNS, or the server 23 of the third SNS after receiving the SNS login information, from the server 21 of the first SNS, the server 22 of the second SNS, or the server 23 of the third SNS. The user information authentication control unit 103 then instructs the user information management unit 102 to store the received SNS access authentication information in association with the corresponding user ID.

The user information management unit 102, having received the instruction to register the server login information and the server access authentication information in association with the user ID from the user information authentication control unit 103, registers the server login information and the server access authentication information in association with the user ID. Further, having received the instruction to store the server access authentication information in association with the user ID from the user information authentication control unit 103, the user information management unit 102 stores the server access authentication information in association with the corresponding user ID.

Additionally, having received the instruction to store the SNS access authentication information in association with the user ID from the user information authentication control unit 103, the user information management unit 102 stores the SNS access authentication information in association with the corresponding user ID. The user information management unit 102 includes a user information database constituted by a hard disc, an optical disc, a semiconductor memory, or the like, for example.

The shared content information gathering control unit 101 accesses the server 21 of the first SNS, the server 22 of the second SNS, and the server 23 of the third SNS using the SNS access authentication information stored in association with the user ID by the user information management unit 102, and gathers shared content information including the shared content shared by the user, which is stored in the servers 21, 22, 23. Here, the gathered shared content information may include all of the shared content information that can be gathered using the SNS access authentication information, shared content information corresponding to content newly shared to the servers of the respective SNSs, among the shared content information that can be gathered using the SNS access authentication information, or updated shared content information among the shared content information that can be gathered using the SNS access authentication information. The shared content information gathering control unit 101 gathers the shared content information periodically at predetermined times or time intervals, for example. Note that the shared content information may be gathered at a different timing such as a timing specified by the user or an update timing of the shared content information. The shared content information gathering control unit 101 attaches a shared content ID used to identify the shared content to the gathered shared content, and issues an instruction to store the gathered shared content in the content information management unit 106 in association with the shared content ID. The shared content information gathering control unit 101 then creates the shared content table 203 on which the attached shared content ID is associated with an SNS ID used to identify the SNS on which the shared content was shared. The shared content information gathering control unit 101 then issues an instruction to store the created shared content table 203 in the content information management unit 106. Here, the shared content information gathering control unit 101 issues an instruction to store the gathered shared content and the information attached to or associated with the shared content in the content information management unit 106 using the SNS access authentication information that was used to gather the shared content information.

On the shared content table 203 shown in FIG. 3, for example, a shared content ID "SC00101" is associated with an SNS ID "S1" representing the first SNS, thereby indicating that shared content having the shared content ID "SC00101" was shared on the first SNS. Further, a shared content ID "SC00102" is associated with the SNS ID "S1" representing the first SNS, thereby indicating that shared content having the shared content ID "SC00102" was shared on the first SNS. Furthermore, a shared content ID "SC00103" is associated with an SNS ID "S2" representing the second SNS, thereby indicating that shared content having the shared content ID "SC00103" was shared on the second SNS. Moreover, a shared content ID "SC00104" is associated with an SNS ID "S3" representing the third SNS, thereby indicating that shared content having the shared content ID "SC00104" was shared on the third SNS.

The terminal content information gathering control unit 104 gathers the terminal content information including the terminal content that was forwarded using the server access authentication information by the content information forwarding unit 112 of the application 110 operating on the first terminal 11, the second terminal 12, and the third terminal 13. The terminal content information gathering control unit 104 attaches a terminal content ID used to identify the terminal content to the gathered terminal content, and issues an instruction to store the gathered terminal content in the content information management unit 106 in association with the terminal content ID. The terminal content information gathering control unit 104 then creates the terminal content table 204 on which the attached terminal content ID is associated with a terminal ID used to identify the terminal on which the terminal content is stored. The terminal content information gathering control unit 104 then issues an instruction to store the created terminal content table 204 in the content information management unit 106. Here, the terminal content information gathering control unit 104 issues an instruction to store the gathered terminal content and the information attached to or associated with the terminal content in the content information management unit 106 using the server access authentication information that was used to gather the terminal content information.

On the terminal content table 204 shown in FIG. 4, for example, terminal content IDs "TC00101" and "TC00103" are associated with a terminal ID "T00101", a terminal content ID "TC00102" is associated with a terminal ID "T00102", and a terminal content ID "TC00104" is associated with a terminal ID "T00103".

The content information management unit 106 stores and manages the content information. Here, the content information includes content, information attached to or associated with the content, and so on, for example. Having received the instruction to store the shared content information (the shared content and the information attached to or associated with the shared content), which was issued by the shared content information gathering control unit 101 using the SNS access authentication information, the content information management unit 106 obtains the user ID that is associated with the used SNS access authentication information by referring to the user information management unit 102, and stores the shared content information for which the storage instruction was received in association with the user ID. Having received the instruction to store the terminal content information (the terminal content and the information attached to or associated with the terminal content), which was issued by the terminal content information gathering control unit 104 using the server access authentication information, the content information management unit 106 obtains the user ID that is associated with the used server access authentication information by referring to the user information management unit 102, and stores the terminal content information for which the storage instruction was received in association with the user ID. The content information management unit 106 includes a content information database constituted by a hard disc, an optical disc, a semiconductor memory, or the like, for example.

The content information connection unit 105 compares the terminal content and the shared content that are stored in the content information management unit 106 in association with an identical user ID, and having determined a match, associates the terminal content ID of the matching terminal content with the shared content ID of the shared content. Here, the content is compared using image information relating to the content and the information attached to or associated with the content. The compared content may include all of the terminal content and shared content stored in the content information management unit 106 in association with an identical user ID, or a part (for example, content that has not yet been compared or determined to match, newly stored content, or the like) of one or both of the terminal content and the shared content stored in the content information management unit 106 in association with an identical user ID. The content information connection unit 105 compares the content periodically at predetermined times or time intervals, for example. Note that the content may be compared at a different timing such as a timing at which content is newly stored in the content information management unit 106 or an update timing of the content information managed by the content information management unit 106. The content information connection unit 105 creates the matching shared content correspondence table 205 on which the terminal content ID and the shared content ID of the matching terminal content and shared content are associated with each other. The content information connection unit 105 then issues an instruction to store the created matching shared content correspondence table 205 in the content information management unit 106 in association with the user ID with which the compared content is associated.

The content information management unit 106, having received the instruction to store the matching shared content correspondence table 205 in association with the user ID from the content information connection unit 105, stores the matching shared content correspondence table 205 for which the storage instruction was received in association with the user ID.

Note that the shared content information gathering control unit 101 or the content information connection unit 105 may delete either one of the matching shared content and terminal content that are associated with each other on the matching shared content correspondence table 205 from the content information management unit 106. This point applies likewise to other embodiments to be described below.

On the matching shared content correspondence table 205 shown in FIG. 5, for example, the terminal content having the terminal content ID "TC00101" is shown to match the shared content having the shared content ID "SC00101", and the terminal content having the terminal content ID "TC00102" is shown to match the shared content having the shared content ID "SC00102". Further, on the matching shared content correspondence table 205, the terminal content having the terminal content ID "TC00102" is shown to match the shared content having the shared content ID "SC00103", the terminal content having the terminal content ID "TC00103" is shown to match the shared content having the shared content ID "SC00104", and the terminal content having the terminal content ID "TC00104" is shown not to match any shared content.

The content information access control unit 107 accesses the content information management unit 106 using the server access authentication information received together with the content information access request from the content information display control unit 113 of the application 110 operating on the first terminal 11, the second terminal 12, and the third terminal 13, receives obtainable content information from the content information management unit 106, and transmits the received content information to the content information display control unit 113. Here, the content information includes content, information attached to or associated with the content, and so on, for example. Note that when the content information access control unit 107 receives a condition on which to access the content information together with the content information access request from the content information display control unit 113, the content information access control unit 107 may receive a content information that satisfies the condition, among the obtainable content information, from the content information management unit 106 and transmit the received content information to the content information display control unit 113.

The content information management unit 106, when accessed by the content information access control unit 107 using the server access authentication information, transmits content information (the obtainable content information) that is associated with the user ID associated with the used server access authentication information to the content information access control unit 107 by referring to the user information management unit 102.

Additionally, when the content information access control unit 107 accesses the content information management unit 106 in order to receive the obtainable content information from the content information management unit 106, the content information access control unit 107 may receive the content information while treating content determined to match on the basis of the matching shared content correspondence table 205 as identical content. For example, by referring to the matching shared content correspondence table 205 when accessing the content information in sequence using the terminal content ID as a reference in order to receive the content information, the shared content information (the shared content, the information attached to or associated with the shared content, the SNS ID associated with the shared content on the shared content table 203, and so on) that is associated with the shared content ID associated with the subject terminal content ID is received together with, i.e. in association with, the terminal content information (the terminal content, the information attached to or associated with the terminal content, the terminal ID associated with the terminal content on the terminal content table 204, and so on) associated with the subject terminal content ID. Moreover, for example, only one of the terminal content and the shared content determined to match each other is received. Note that when the content information is accessed in sequence using the shared content ID as a reference in order to receive the content information, for example, the terminal content information that is associated with the terminal content ID associated with the subject shared content ID may likewise be received together with, i.e. in association with, the shared content information associated with the subject shared content ID. Furthermore, when the content information is accessed in sequence using both the terminal content ID and the shared content ID as a reference in order to receive the content information, for example, the shared content information or terminal content information that is associated with the shared content ID or terminal content ID associated with the subject terminal content ID or shared content ID may be received together with, i.e. in association with, the terminal content information or shared content information associated with the subject terminal content ID or shared content ID while skipping shared content information or terminal content information that is associated with the shared content ID or terminal content ID but has already been called up in association with the terminal content ID or the shared content ID. For example, a rule according to which an identical content ID is attached to content determined to match may be applied to all of the managed terminal content and shared content, and on the basis of this rule, the content information management unit 106 may attach a new, common content ID to the terminal content and the shared content. The content information access control unit 107 may then access the content information in sequence using the common content ID as a reference in order to receive the content information.

According to this method, with respect to content determined to match, the content information access control unit 107 can receive content information in which the corresponding terminal content information (the terminal content, the terminal ID, and so on) and shared content information (the SNS ID and so on) are associated with each other, and then transmit the received content information to the content information display control unit 113. Further, with respect to content determined not to match, the content information access control unit 107 can receive the corresponding terminal content information (the terminal content, the terminal ID, and so on) or the corresponding shared content information (the shared content, the SNS ID, and so on), and then transmit the received terminal content information or shared content information to the content information display control unit 113.

The content information display control unit 113 performs control to display the content information received from the content information access control unit 107 on the display. For example, in a case where the content information is received from the content information access control unit 107 using the terminal content ID as a reference, the content information display control unit 113 performs control to display the terminal content associated with the subject terminal content ID, information indicating the terminal that corresponds to the terminal ID associated with the terminal content, and information indicating the SNS that corresponds to the SNS ID associated with the terminal content, when an SNS ID is associated therewith, on the display in association with each other.

In FIG. 6, the content information display control unit 113 displays terminal content (images of terminal content, for example) 301 to 315 on the display. A terminal mark 214 is displayed in a lower left corner of the terminal content 301 to 315. The terminal mark 214 depicting "A", which is displayed in the terminal content 301, 302, 307, 308, 310, 314, denotes the first terminal 11, for example. The terminal mark 214 depicting "B", which is displayed in the terminal content 303 to 305 and 311 to 313, denotes the second terminal 12, for example. The terminal mark 214 depicting "C", which is displayed in the terminal content 306, 309, 315, denotes the third terminal 13, for example. The terminal mark 214 is an image depicting a smartphone, a tablet, a PC, or a digital camera, an image from which the terminal can be identified, or the like, for example.

Further, a sharing mark 213 is displayed in an upper right corner of a part of the terminal content 301 to 305. The sharing mark 213 depicting "α", which is displayed in the terminal content 301, 303, 307, denotes the first SNS, for example. The sharing mark 213 depicting "β", which is displayed in the terminal content 303, 314, denotes the second SNS, for example. The sharing mark 213 depicting "γ", which is displayed in the terminal content 304, 312, denotes the third SNS, for example. The sharing mark 213 is an image depicting a logo of the SNS, an image from which the SNS can be identified, or the like, for example.

Note that in this example, the terminal mark 214 is displayed in the lower left corner of the content and the sharing mark 213 is displayed in the upper right corner of the content, but display positions of the terminal mark 214 and the sharing mark 213 are not limited thereto. Further, in this example, the terminal mark 214 and the sharing mark 213 are displayed so as to be superimposed on the content, but a method of displaying the terminal mark 214 and the sharing mark 213 is not limited thereto.

In this embodiment, the content information management unit 106 corresponds to an example of the storage unit, the first SNS, second SNS, and third SNS correspond to examples of the sharing service, the first terminal 11, second terminal 12, and third terminal 13 correspond to examples of the storage terminal, and the matching shared content correspondence table 205 corresponds to an example of the matching shared content correspondence table.

Figure 7:
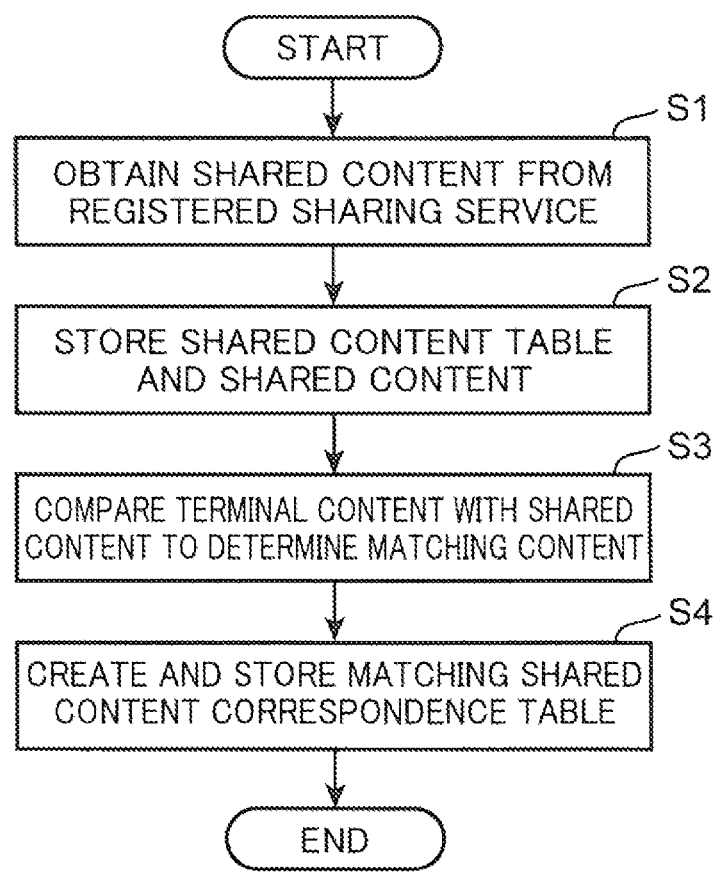
FIG. 7 is a schematic flowchart showing an example of operations of a shared content information gathering control unit and a content information connection unit according to the first embodiment.

FIG. 7 is a schematic flowchart showing an example of operations of the shared content information gathering control unit 101 and the content information connection unit 105 according to the first embodiment. First, in step S1, the shared content information gathering control unit 101 obtains the shared content of the user from the registered sharing services (in the first embodiment, the first SNS, the second SNS, and the third SNS).

Next, in step S2, the shared content information gathering control unit 101 creates the shared content table 203, and stores the created shared content table 203 together with the obtained shared content in the content information management unit 106. Next, in step S3, the content information connection unit 105 compares the terminal content stored in the content information management unit 106 with the shared content to detect matching content. Next, in step S4, the content information connection unit 105 creates the matching shared content correspondence table 205, and stores the created matching shared content correspondence table 205 in the content information management unit 106. The procedure is then terminated.

Figure 8:
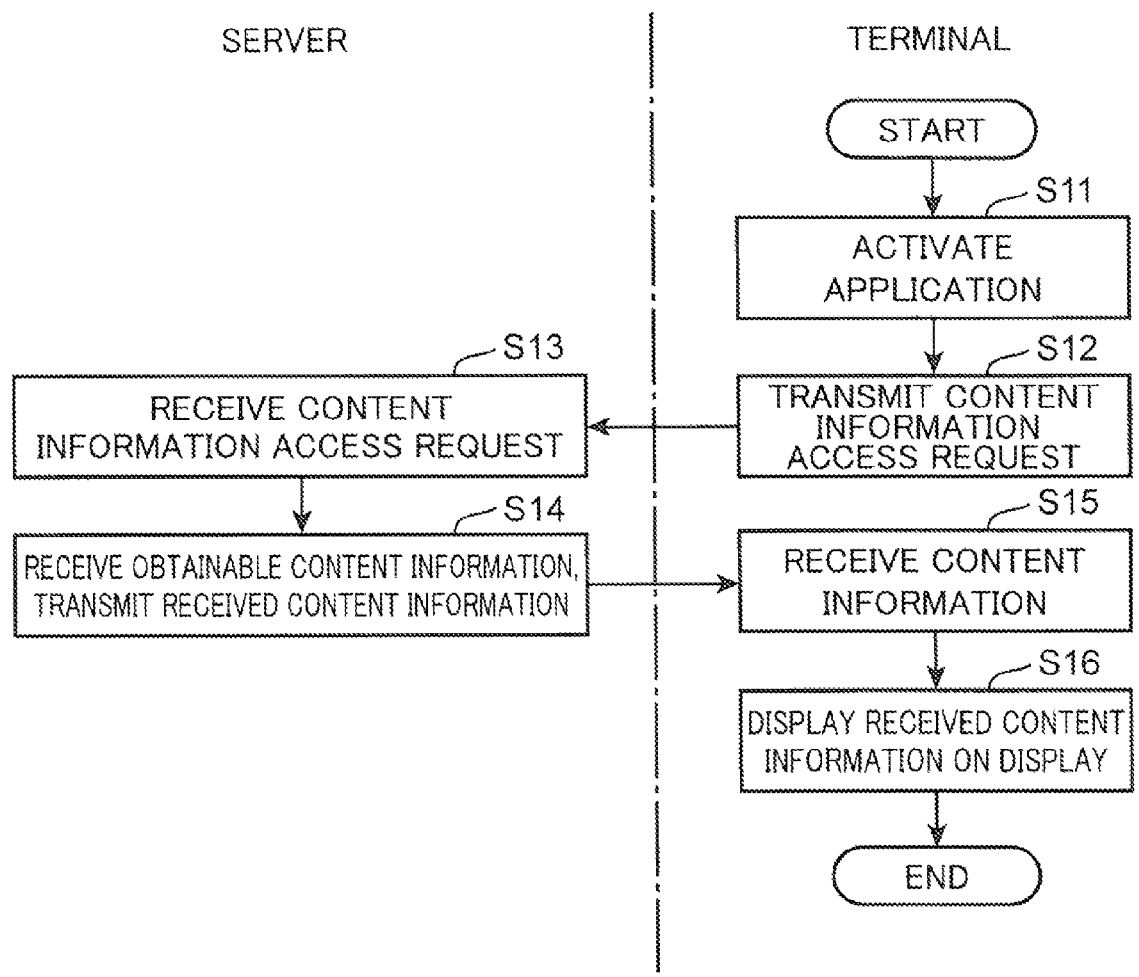
FIG. 8 is a schematic flowchart showing an example of an operation for displaying content information according to the first embodiment.

FIG. 8 is a schematic flowchart showing an example of an operation for displaying content information according to the first embodiment.

First, in step S11, the application 110 is activated in response to a user operation. Next, in step S12, the content information display control unit 113 of the application 110 transmits the content information access request to the content information access control unit 107 provided in the server 10.

Next, in step S13, the content information access control unit 107 provided in the server 10 receives the content information access request transmitted from the content information display control unit 113 of the application 110. Next, in step S14, the content information access control unit 107 accesses the content information management unit 106, receives the obtainable content information from the content information management unit 106, and transmits the received content information to the content information display control unit 113 of the application 110. Here, the content information access control unit 107 accesses the content information in sequence using the terminal content ID as a reference, for example, in order to receive, from the content information management unit 106, content information in which the terminal content associated with the subject terminal content ID, the terminal ID, and the SNS ID associated with the shared content ID that is associated with the subject terminal content ID are associated with each other. The content information access control unit 107 then transmits the received content information to the content information display control unit 113.

Next, in step S15, the content information display control unit 113 of the application 110 receives the content information transmitted by the content information access control unit 107 provided in the server 10. Here, using the terminal ID as a reference, for example, the content information display control unit 113 receives, from the content information access control unit 107, content information in which the terminal content associated with the subject terminal content ID, the terminal ID, and the SNS ID associated with the shared content ID that is associated with the subject terminal content ID are associated with each other. Next, in step S16, the content information display control unit 113 performs control to display the received content information on the display, whereupon the procedure is terminated.

In step S16, as shown in FIG. 6, the terminal mark 214 specified by the terminal ID is displayed in association with the terminal content (images, for example) 301 to 315. Further, in step S16, as shown in FIG. 6, the sharing mark 213 specified by the SNS ID is displayed on the display in association with the terminal content (images, for example) 301, 303, 304, 307, 312, 314.

In the first embodiment, as described above, the content information access control unit 107 is capable of receiving content information from the content information management unit 102 while treating content determined to match as identical content. Accordingly, the content information display control unit 113 that receives the content information from the content information access control unit 107 can ensure that matching terminal content and shared content are not displayed in duplicate. Moreover, the information respectively attached to or associated with the matching terminal content and shared content can be displayed in association. As a result, the content displayed on the display can be prevented from becoming complicated. Furthermore, a display region of the display can be used effectively.

Further, in the first embodiment, the terminal mark 214 representing the terminal ID is displayed on the display in association with the content displayed on the display. As a result, when the user views the content displayed on the display, the user can easily identify the storage destination terminal of the content from the terminal mark 214.

Furthermore, in the first embodiment, the sharing mark 213 representing the sharing destination SNS is displayed on the display in association with the content displayed on the display. As a result, when the user views the content displayed on the display, the user can easily determine the content that has been shared by him/herself in the past on the sharing service, among the displayed content, as well as the sharing service on which the content was shared, from the sharing mark 213.

Note that in the first embodiment, the terminal content information gathering control unit 104 attaches and forms associations between the terminal content IDs and the terminal IDs, while the shared content information gathering control unit 101 attaches and forms associations between the shared content IDs and the SNS IDs. Instead, however, the content information management unit 106 may attach and form associations between the IDs.

Further, in the first embodiment, the terminal content IDs and the shared content IDs are attached and managed individually as content IDs for identifying the terminal content and content IDs for identifying the shared content, respectively, but instead, integrated content IDs may be attached and managed.

Furthermore, in the first embodiment, the content information display control unit 113 receives a terminal ID or an SNS ID stored in and managed by the content information management unit 106 by issuing a request to the content information access control unit 107, and performs control to display the terminal mark or the sharing mark corresponding to the received terminal ID or SNS ID. Instead, however, the content information management unit 106 may store and manage the terminal marks and the sharing marks in association with the terminal IDs or the SNS IDs, and the content information display control unit 113 may receive a terminal ID or an SNS ID stored in and managed by the content information management unit 106 by issuing a request to the content information access control unit 107, and perform control to display the received terminal mark or sharing mark.

Note that in the first embodiment, a part of the functions of the user information authentication control unit 103 may be executed by the application 110 of the first terminal 11, the second terminal 12, and the third terminal 13. Similarly, in the first embodiment, a part of the functions of the terminal content information gathering control unit 104 may be executed by the application 110 of the first terminal 11, the second terminal 12, and the third terminal 13. Moreover, likewise in the first embodiment, a part of the functions of the content information access control unit 107 may be executed by the application 110 of the first terminal 11, the second terminal 12, and the third terminal 13. In other words, it is sufficient for the functions of the server 10 according to the first embodiment, shown in FIG. 1, to be included in the overall content display control system 1. These points apply likewise to the embodiments to be described below.

Second Embodiment

Figure 9:
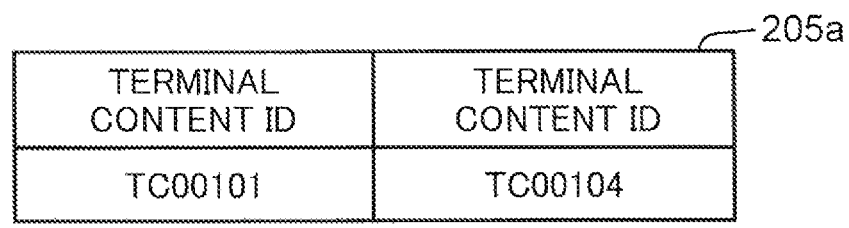
FIG. 9 is a view showing an example of a matching terminal content correspondence table created according to a second embodiment.
Figure 10:
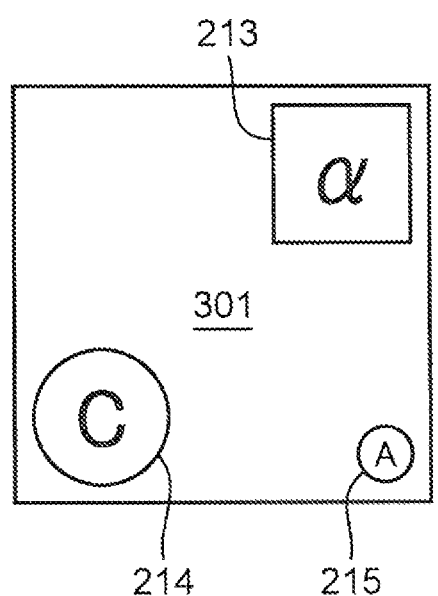
FIG. 10 is a schematic view showing an example of a display of content information according to the second embodiment.

FIG. 9 is a view showing an example of a matching terminal content correspondence table 205a created according to a second embodiment. FIG. 10 is a schematic view showing an example of a display of content information according to the second embodiment. In the second embodiment, identical elements to the first embodiment have been allocated identical reference numerals, and detailed description thereof has been omitted. Function blocks of a server and a terminal according to the second embodiment are similar to those of the first embodiment, shown in FIG. 1. A content display control system according to the second embodiment is configured similarly to that of the first embodiment, shown in FIG. 2. The second embodiment will be described below while focusing on differences with the first embodiment.

The content information connection unit 105 according to the second embodiment, as well as performing the functions of the first embodiment, compares the terminal content stored in the content information management unit 106 with terminal content stored anew in association with an identical user ID, and when a match is determined, associates the respective terminal content IDs of the matching terminal content with each other. Here, the content is compared using the image information relating to the content and the information attached to or associated with the content. The content information connection unit 105 creates the matching terminal content correspondence table 205a on which the respective terminal content IDs of the matching terminal content are associated with each other. The content information connection unit 105 then issues instruction to store the created matching terminal content correspondence table 205a in the content information management unit 106 in association with the user ID with which the compared content is associated.

The content information management unit 106, having received the instruction to store the matching terminal content correspondence table 205a in association with the user ID from the content information connection unit 105, stores the matching terminal content correspondence table 205a for which the storage instruction was received in association with the user ID.

Note that the terminal content information gathering control unit 104 or the content information connection unit 105 may delete one of the sets of matching terminal content associated on the matching terminal content correspondence table 205a from the content information management unit 106. This point applies likewise to the other embodiments to be described below.

On the matching terminal content correspondence table 205a shown in FIG. 9, for example, the terminal content having the terminal content ID "TC00101" is shown to match the terminal content having the terminal content ID "TC00104". As can be seen by referring to the terminal content table 204 shown in FIG. 4, the matching terminal content correspondence table 205a shown in FIG. 9 indicates that the terminal content having the terminal content ID "TC00101" has been copied or moved from the first terminal 11 having the terminal ID "T00101" to the third terminal 13 having the terminal ID "T00103".

The content information access control unit 107 according to the second embodiment, when accessing the content information management unit 106 in order to receive the obtainable content information from the content information management unit 106, is capable of receiving the content information while treating content determined to match on the basis of the matching terminal content correspondence table 205a as identical content. For example, by referring to the matching terminal content correspondence table 205a when accessing the content information in sequence using the terminal content ID as a reference in order to receive the content information, the terminal content information (the terminal content, the information attached to or associated with the terminal content, the terminal ID associated with the terminal content on the terminal content table 204, and so on) associated with the terminal content ID that is associated with the subject terminal content ID is received together with, i.e. in association with, the terminal content information associated with the subject terminal content ID while skipping terminal content information that is associated with the terminal content ID but has already been called up in association with another terminal content ID. Additionally, for example, a situation in which identical terminal content is extracted in duplicate can be prevented by receiving only one of the sets of terminal content determined to match.

According to this method, with respect to content determined to match, the content information access control unit 107 can receive content information in which the corresponding sets of terminal content information (the terminal IDs and so on) are associated with each other, and then transmit the received content information to the content information display control unit 113.

After receiving the content information from the content information access control unit 107 using the terminal content ID as a reference, for example, the content information display control unit 113 according to the second embodiment performs control to display the terminal content associated with the subject terminal content ID, information indicating the terminal (the terminal on which the terminal content is currently stored, for example) that corresponds to the terminal ID associated with the terminal content, and information indicating a terminal (a terminal on which the terminal content was previously stored, for example) that corresponds to another terminal ID associated with the terminal content, when another terminal ID is associated therewith, on the display in association with each other.

In FIG. 10, the terminal content 301 shown in FIG. 6 has the terminal content ID "TC00101". In FIG. 6, the terminal mark 214 depicting "A", which represents the first terminal 11, is displayed in the lower left corner of the terminal content 301. In FIG. 10, on the other hand, the terminal mark 214 depicting "C", which represents the third terminal 13, is displayed in the lower left corner of the terminal content 301. Furthermore, in FIG. 10, a terminal mark 215 depicting "A", which represents the first terminal 11, is displayed in a lower right corner of the terminal content 301 as a terminal mark representing the terminal ID that corresponds to the terminal in which the terminal content was stored previously. Further, the terminal mark 214 representing the terminal ID that corresponds to the terminal in which the terminal content is currently stored is displayed in the lower left corner of the terminal content 301.

As shown in FIG. 10, the content information display control unit 113 may display the terminal mark 215 representing the terminal ID that corresponds to the terminal in which the terminal content was previously stored in a smaller size than the terminal mark 214 representing the terminal ID that corresponds to the terminal in which the terminal content is currently stored. In so doing, the user can easily identify the terminal in which the terminal content is currently stored. In the second embodiment, the matching terminal content correspondence table 205a corresponds to an example of the terminal match information and the matching terminal content correspondence table.

Note that in this example, the terminal mark 214 of the terminal in which the content is currently stored is displayed in the lower left corner of the content, the terminal mark 215 of the terminal in which the content was previously stored is displayed in the lower right corner of the content in a smaller size than the terminal mark 214, and the sharing mark 213 is displayed in the upper right corner of the content. However, the display positions and sizes of the terminal mark 214, the terminal mark 215, and the sharing mark 213 are not limited thereto. Further, in this example, the terminal mark 214, the terminal mark 215, and the sharing mark 213 are displayed so as to be superimposed on the content, but the method of displaying the terminal mark 214, the terminal mark 215, and the sharing mark 213 is not limited thereto.

Figure 11:
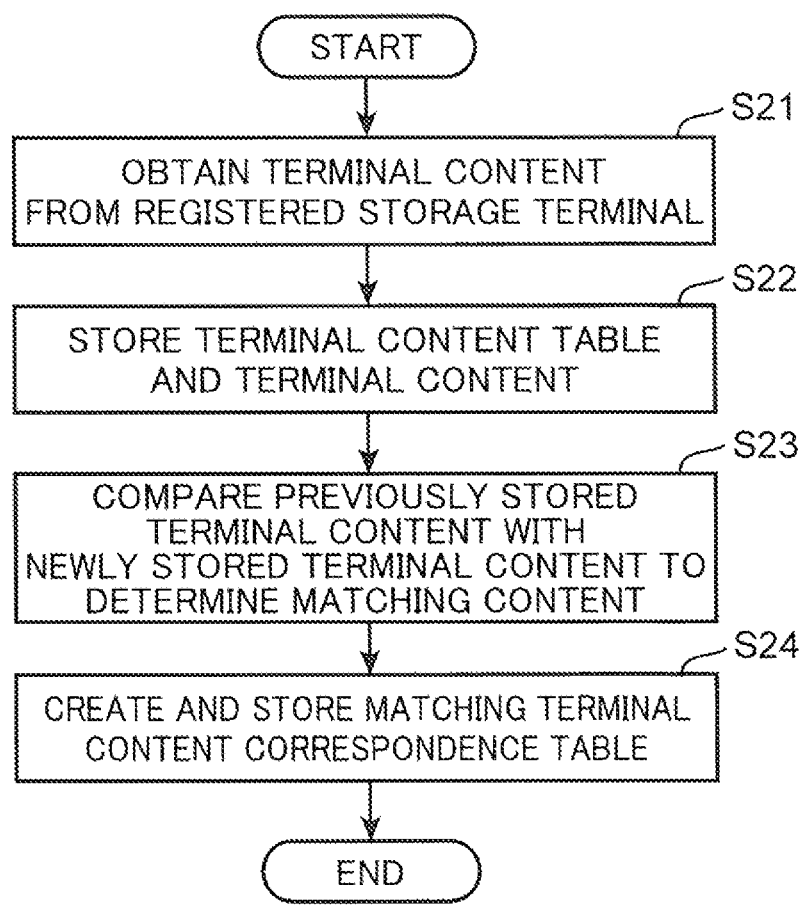
FIG. 11 is a schematic flowchart showing an example of operations of a terminal content information gathering control unit and a content information connection unit according to the second embodiment.

FIG. 11 is a schematic flowchart showing an example of operations of the terminal content information gathering control unit 104 and the content information connection unit 105 according to the second embodiment. First, in step S21, the terminal content information gathering control unit 104 obtains the terminal content of the user from the registered storage terminal (in the second embodiment, the third terminal 13).

Next, in step S22, the terminal content information gathering control unit 104 creates the terminal content table 204 and stores the created terminal content table 204 together with the obtained terminal content in the content information management unit 106. Next, in step S23, the content information connection unit 105 compares the terminal content already stored in the content information management unit 106 with the newly stored terminal content to determine whether or not the content matches. Next, in step S24, when the previously stored terminal content includes terminal content that matches the newly stored terminal content, the content information connection unit 105 creates the matching terminal content correspondence table 205a on which the terminal content ID specifying the newly stored terminal content is associated with the terminal content ID specifying the previously stored terminal content that matches the newly stored terminal content, and stores the created matching terminal content correspondence table 205a in the content information management unit 106. The procedure is then terminated.

Figure 12:
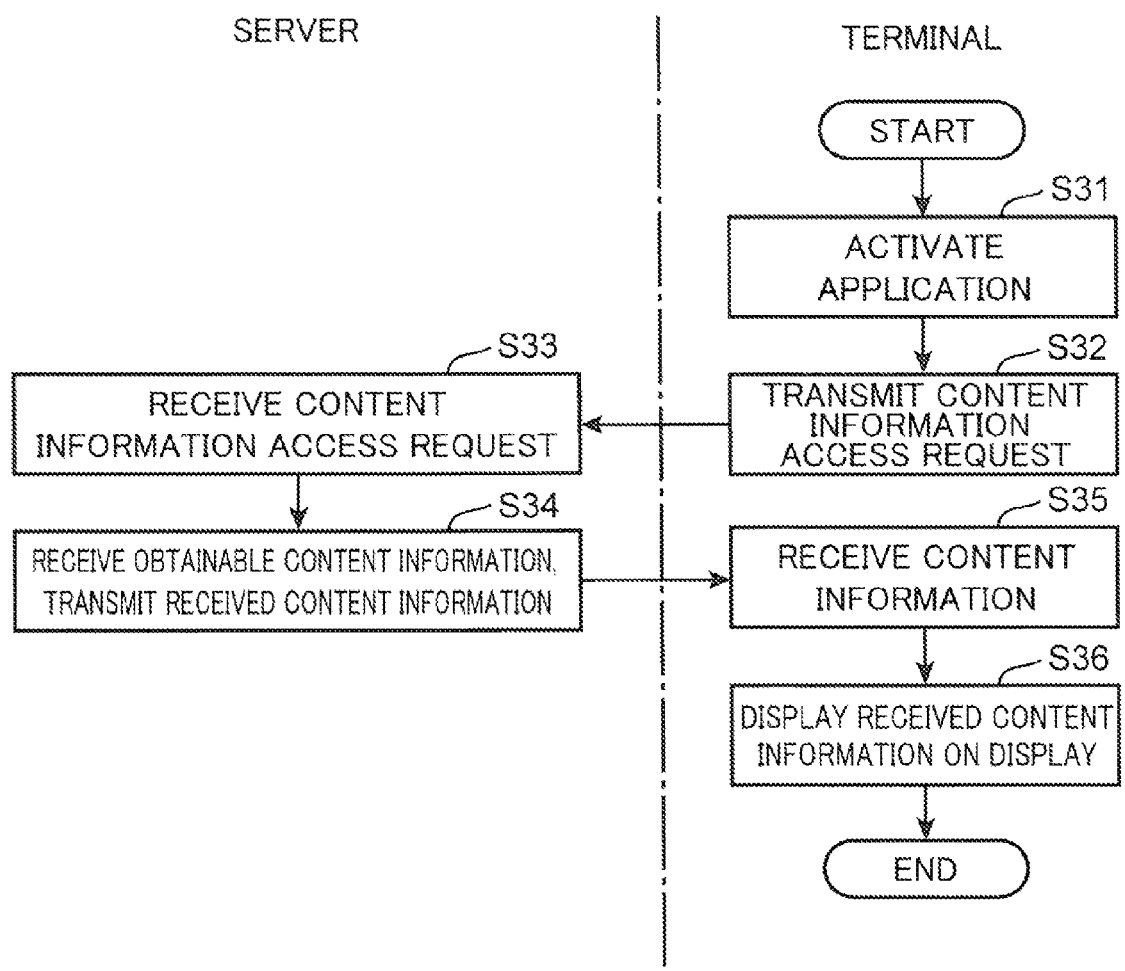
FIG. 12 is a schematic flowchart showing an example of an operation for displaying content information according to the second embodiment.

FIG. 12 is a schematic flowchart showing an example of an operation for displaying content information according to the second embodiment.

Processing of step S31 and step S32 is identical to the processing of step S11 and step S12 shown in FIG. 8. Further, processing of step S33 is identical to the processing of step S13 shown in FIG. 8.

In step S34 following step S33, the content information access control unit 107 accesses the content information management unit 106 in order to receive the obtainable content information from the content information management unit 106, and transmits the received content information to the content information display control unit 113 of the application 110. Here, the content information access control unit 107 accesses the content information in sequence using the terminal content ID as a reference, for example, in order to receive, from the content information management unit 106, content information in which the terminal content associated with the subject terminal content ID, the terminal ID, and a terminal ID that is associated with another terminal content ID associated with the subject terminal content ID are associated with each other while skipping terminal content information that is associated with the terminal content ID but has already been called up in association with another terminal content ID. The content information access control unit 107 then transmits the received content information to the content information display control unit 113. Additionally, for example, a situation in which identical terminal content is extracted in duplicate is prevented by receiving only one of the sets of terminal content determined to match.

Next, in step S35, the content information display control unit 113 of the application 110 receives the content information transmitted from the content information access control unit 107 provided in the server 10. Here, using the terminal ID as a reference, for example, the content information display control unit 113 receives, from the content information access control unit 107, content information in which the terminal content associated with the subject terminal content ID, the terminal ID, and a terminal ID that is associated with another terminal content ID associated with the subject terminal content ID are associated with each other. Next, in step S36, the content information display control unit 113 performs control to display the received content information on the display, whereupon the procedure is terminated.

According to the second embodiment, as described above, the terminal mark 215 representing the terminal ID that corresponds to the terminal in which the content was previously stored is displayed on the display together with the terminal mark 214 representing the terminal ID that corresponds to the terminal in which the content is currently stored in association with the content displayed on the display. Therefore, when the user views the content displayed on the display, the user can easily determine a storage destination history of the content from the terminal mark 214 and the terminal mark 215.

Note that the terminal content information gathering control unit 104 may notify the storage destination terminal 11 to 13 of the terminal content ID attached to the terminal content by the terminal content information gathering control unit 104. When the first terminal 11 is notified, for example, the content information forwarding unit 112 of the first terminal 11 may manage the terminal content that has already been forwarded to the server 10 using the terminal content ID. Further, when terminal content is to be forwarded from the terminal 11 to 13 to the server 10, the content information forwarding unit 112 may forward the terminal content ID in association with the terminal content. In this case, the content information connection unit 105 can extract the matching terminal content simply by comparing the terminal content IDs. This point applies likewise to the embodiments to be described below.

Figure 13:
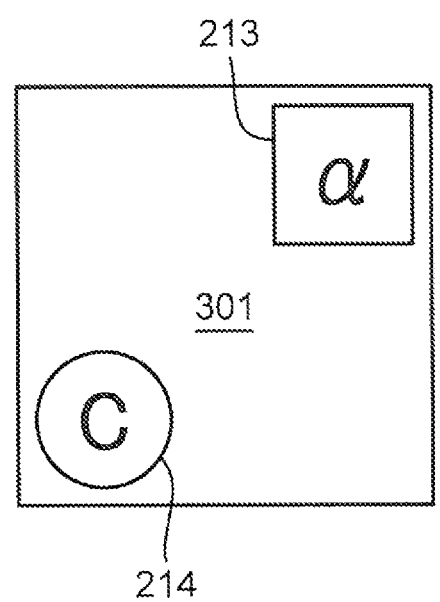
FIG. 13 is a schematic view showing an example of a display of content information according to a modified example of the second embodiment.

FIG. 13 is a schematic view showing an example of a display of content information according to a modified example of the second embodiment. In the second embodiment, the content information display control unit 113 performs control to display the terminal mark 215 representing the terminal ID that corresponds to the terminal in which the content was previously stored in the display in association with the displayed content. Instead, however, the content information access control unit 107 may perform control such that the terminal mark 215 representing the terminal ID that corresponds to the terminal in which the content was previously stored is not displayed on the display in association with the displayed content.

In this case, as shown in FIG. 13, only the terminal mark 214 representing the terminal ID that corresponds to the terminal in which the content is currently stored is displayed on the display in association with the content 301. According to this modified example of the second embodiment, when the user views the content displayed on the display, the user can easily identify the current storage destination of the content from the terminal mark 214.

Third Embodiment

Figure 15:
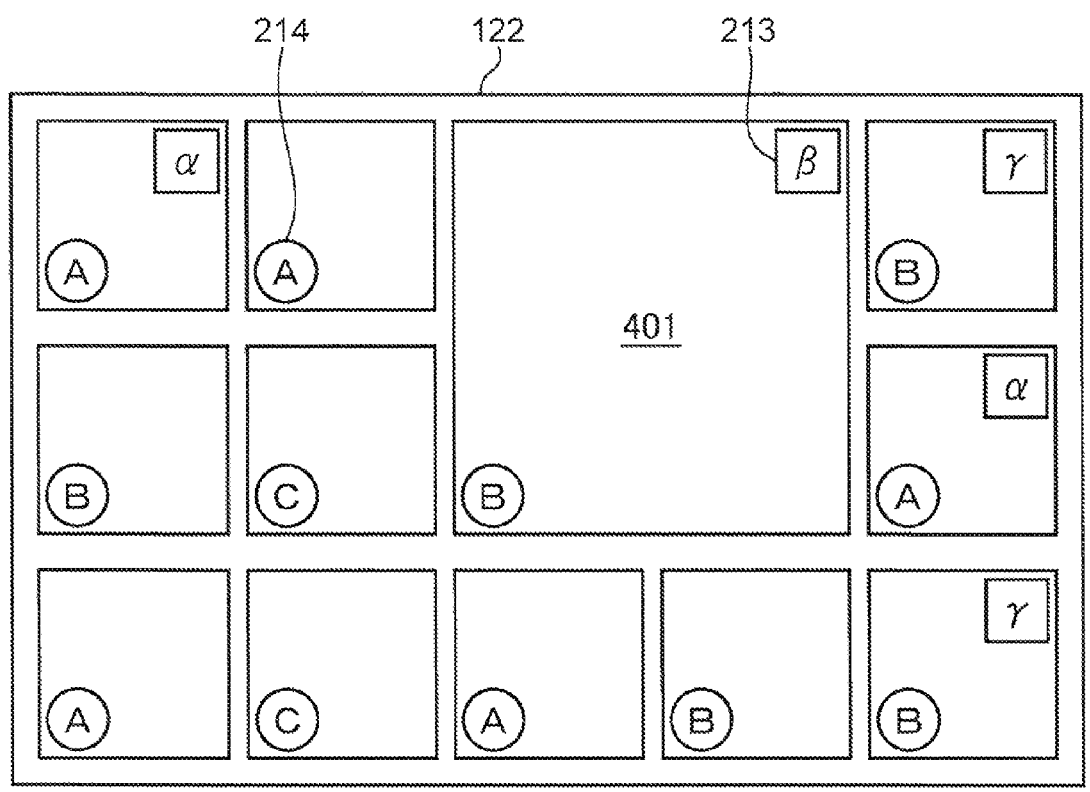
FIG. 15 is a schematic view showing an example of a display of content information according to the third embodiment.

FIG. 14 is a view showing an example of an evaluation information table 206 created according to a third embodiment. FIG. 15 is a schematic view showing an example of a display of content information according to the third embodiment. In the third embodiment, identical elements to the first embodiment have been allocated identical reference numerals, and detailed description thereof has been omitted.

Function blocks of a server and a terminal according to the third embodiment are similar to those of the first embodiment, shown in FIG. 1. A content display control system according to the third embodiment is configured similarly to that of the first embodiment, shown in FIG. 2. The third embodiment will be described below while focusing on differences with the first embodiment.

The shared content information gathering control unit 101 according to the third embodiment gathers not only the shared content, but also favorability ratings and comments or numbers of comments attached as feedback to the shared content in the first to third SNSs. The shared content information gathering control unit 101 creates the evaluation information table 206 on which the terminal content IDs associated with the shared content IDs of the gathered shared content are associated with favorability ratings and numbers of comments in the first to third SNSs. The shared content information gathering control unit 101 then issues an instruction to store the created evaluation information table 206 in the content information management unit 106.

Note that the favorability rating indicates a number of times a button provided on the SNS in order to evaluate the shared content is pressed by another user, for example. Further, the number of comments indicates a number of comments input by another user in relation to the shared content on the SNS, for example.

On the evaluation information table 206 shown in FIG. 14, for example, the terminal content having the terminal content ID "TC00101" has been shared on the first SNS (see FIGS. 3 and 5), and has a favorability rating of 2 and four comments on the first SNS. Further, the terminal content having the terminal content ID "TC00102" has been shared on the first SNS and the second SNS (see FIGS. 3 and 5), and has a favorability rating of 2 and zero comments on the first SNS, and a favorability rating of 3 and two comments on the second SNS. Furthermore, the terminal content having the terminal content ID "TC00103" has been shared on the third SNS (see FIGS. 3 and 5), and has a favorability rating of 5 and four comments on the third SNS.

The content information access control unit 107 according to the third embodiment refers to the evaluation information table 206 (FIG. 14) to calculate a sum of the favorability ratings and the numbers of comments in the first to third SNSs, and transmits content information in which the corresponding terminal content ID is associated with the calculated sum to the content information display control unit 113. The content information display control unit 113 receives the content information in which the subject terminal content ID is associated with the sum of the favorability ratings and the numbers of comments from the content information access control unit 107. The content information display control unit 113 then performs control to display the content associated with the subject terminal content ID in a steadily larger size as the sum of the favorability ratings and the numbers of comments associated with the subject terminal content ID increases, for example. The content information display control unit 113 may set the display size of the content at a multiple of 1 when the sum is zero, a multiple of 2 when the sum is one to five, and a multiple of 4 when the sum is six or more, for example.

In FIG. 15, content 401 is displayed in a larger size than other content so as to occupy a region four times as large as the regions of the other content. In the third embodiment, the favorability ratings and numbers of comments on the evaluation information table 206 shown in FIG. 14 correspond to examples of the evaluation information.

Note that a method of determining the display size of the content is not limited to this method. The content information access control unit 107 calculates the sum of the favorability ratings and the numbers of comments, and the content information display control unit 113 determines the display size of the content on the basis of the sum of the favorability ratings and the numbers of comments. Instead, however, the display size of the content may be determined on the basis of a value calculated using a following equation, for example.

$$N1 \times K1 + N2 \times K2$$

In the equation, N1 is the favorability rating, N2 is the number of comments, and K1 and K2 are respectively predetermined coefficients.

Further, a relationship between the calculated value and the display size is not limited to this relationship.

In the third embodiment, as described above, the display size of the content is increased steadily as the shared content is evaluated more highly. Therefore, when the user views the content displayed on the display, the user can easily determine the evaluation applied to the shared content from the display size of the content.

Note that in the third embodiment, the shared content information gathering control unit 101 creates the evaluation information table 206, but the evaluation information table 206 may be created by the content information management unit 106 or the content information access control unit 107.

Further, in the third embodiment, the value used to determine the display size of the content is calculated by the content information access control unit 107 using the favorability ratings and the numbers of comments, but the value may be calculated by the content information display control unit 113.

Fourth Embodiment

Figure 16:
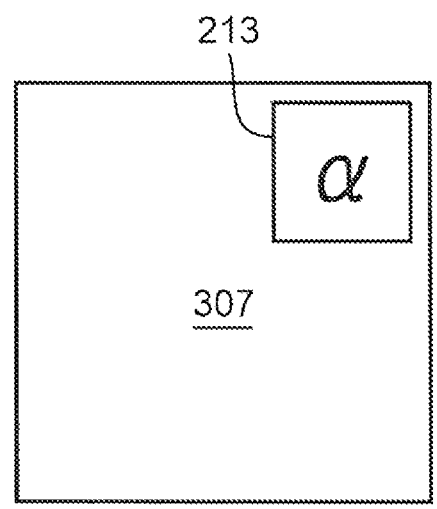
FIG. 16 is a schematic view showing an example of a display of content information according to a fourth embodiment.

FIG. 16 is a schematic view showing an example of a display of content information according to a fourth embodiment. In the fourth embodiment, identical elements to the first embodiment have been allocated identical reference numerals, and detailed description thereof has been omitted. Function blocks of a server and a terminal according to the fourth embodiment are similar to those of the first embodiment, shown in FIG. 1. A content display control system according to the fourth embodiment is configured similarly to that of the first embodiment, shown in FIG. 2. The fourth embodiment will be described below while focusing on differences with the first embodiment.

When terminal content is deleted from the terminal from which the terminal content was obtained, the terminal content information gathering control unit 104 according to the fourth embodiment issues an instruction to delete the terminal ID stored in the content information management unit 106 in association with the terminal content ID from the content information management unit 106.

When terminal content is deleted from the forwarding subject region, the content information forwarding unit 112 according to the fourth embodiment, in addition to performing the functions of the first embodiment, notifies the terminal content information gathering control unit 104 that the deleted terminal content has been deleted. The terminal content information gathering control unit 104, having received the notification, issues an instruction to delete the terminal ID that corresponds to the terminal from which the deleted terminal content has been deleted from the content information management unit 106, in which the terminal ID was stored in association with the terminal content ID associated with the deleted terminal content.

For example, the content information forwarding unit 112 notifies the terminal content information gathering control unit 104 that the deleted terminal content has been deleted, and at the same time transmits terminal content information including the deleted terminal content to the terminal content information gathering control unit 104. The terminal content information gathering control unit 104, having received the notification, compares the received (deleted) terminal content with the terminal content stored in the content information management unit 106 in order to specify the terminal content stored in the content information management unit 106 that corresponds to the received (deleted) terminal content, and issues an instruction to delete the terminal ID that corresponds to the terminal from which the deleted terminal content has been deleted, among the terminal IDs stored in the content information management unit 106 in association with the terminal content ID associated with the specified terminal content. Here, the content is compared using the image information relating to the content and the information attached to or associated with the content.

Note that the terminal content information gathering control unit 104 may notify the storage destination terminal 11 to 13 of the terminal content ID attached to the terminal content by the terminal content information gathering control unit 104. When the first terminal 11 is notified, for example, the content information forwarding unit 112 of the first terminal 11 may manage the terminal content that has already been forwarded to the server 10 using the terminal content ID. Further, when terminal content is to be forwarded from the terminal 11 to 13 to the server 10, the content information forwarding unit 112 may forward the terminal content ID in association with the terminal content. In this case, the terminal content information gathering control unit 104 can specify the terminal content stored in the content information management unit 106 that corresponds to the received (deleted) terminal content simply by referring to the terminal content ID.

Further, in this example, when terminal content is deleted from the forwarding subject region, the content information forwarding unit 112 notifies the terminal content information gathering control unit 104 that the deleted terminal content has been deleted, but instead, the terminal content information gathering control unit 104 may learn that the deleted terminal content has been deleted by monitoring the content information forwarding unit 112.

Note that in this example, the terminal content information gathering control unit 104 compares the content, but the content may be compared by the content information connection unit 105.

With respect to content from which the terminal ID has been deleted, the deleted terminal ID corresponds to the terminal from which the content was deleted, and therefore the terminal ID that corresponds to the terminal from which the content was deleted is not associated with the deleted content likewise in the content information received by the content information display control unit 113 according to the fourth embodiment from the content information access control unit 107. Therefore, when the content 307 shown in FIG. 6 is deleted from the first terminal 11, for example, the terminal mark 214 is not displayed in the lower left corner, as shown in FIG. 16, and instead, the content 307 is displayed on the display with only the sharing mark 213 displayed in the upper right corner.

In the fourth embodiment, as described above, a terminal mark is not displayed on the display in association with content that has been deleted from a terminal. Therefore, when the user views the content displayed on the display, the user can easily confirm that the content has been deleted from the terminal.

Note that in the fourth embodiment, when terminal content is deleted from a terminal, the corresponding terminal ID is deleted from the content information management unit 106, but instead of deleting the terminal ID, the terminal ID may be managed as history information indicating that the terminal content has been deleted from the terminal. In this case, for example, the content information display control unit 113 receives content information including the history information from the content information access control unit 107, and performs control to display the terminal mark 214 or the terminal mark 215 corresponding to the terminal from which the content has been deleted in a translucent condition or the like on the display.

Furthermore, in the fourth embodiment, when terminal content is deleted from a terminal, the corresponding terminal ID is deleted from the content information management unit 106, but instead, the deleted terminal content or the content information corresponding to the deleted terminal content may be deleted from the content information management unit 106.

Fifth Embodiment

Figure 17:
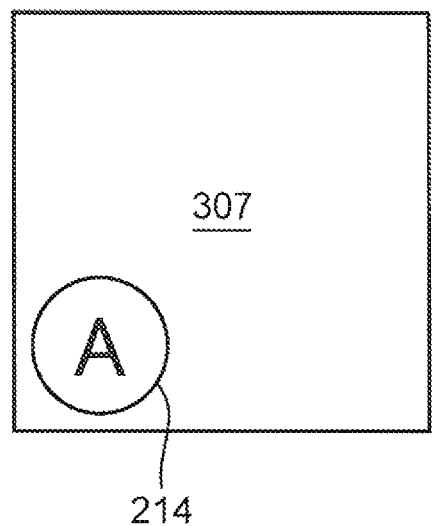
FIG. 17 is a schematic view showing an example of a display of content information according to a fifth embodiment.

FIG. 17 is a schematic view showing an example of a display of content information according to a fifth embodiment. In the fifth embodiment, identical elements to the first embodiment have been allocated identical reference numerals, and detailed description thereof has been omitted. Function blocks of a server and a terminal according to the fifth embodiment are similar to those of the first embodiment, shown in FIG. 1. A content display control system according to the fifth embodiment is configured similarly to that of the first embodiment, shown in FIG. 2. The fifth embodiment will be described below while focusing on differences with the first embodiment.

When shared content is deleted from the SNS from which the shared content was obtained, the shared content information gathering control unit 101 according to the fifth embodiment issues an instruction to delete the SNS ID stored in the content information management unit 106 in association with the shared content ID from the content information management unit 106.

When shared content is deleted from the SNS from which the shared content was obtained, the shared content information gathering control unit 101 according to the fifth embodiment, in addition to performing the functions of the first embodiment, receives notification that the deleted shared content has been deleted from the server of the SNS. The shared content information gathering control unit 101 then issues an instruction to delete the SNS ID that corresponds to the SNS from which the deleted shared content has been deleted from the content information management unit 106, in which the SNS ID was stored in association with the shared content ID associated with the deleted shared content.

For example, the shared content information gathering control unit 101 receives notification from the server of the SNS that the deleted shared content has been deleted, and at the same time receives shared content information including the deleted shared content from the server of the SNS. The shared content information gathering control unit 101 then compares the received (deleted) shared content with the shared content stored in the content information management unit 106 in order to specify the shared content stored in the content information management unit 106 that corresponds to the received (deleted) shared content, and issues an instruction to delete the SNS ID that corresponds to the SNS from which the deleted shared content has been deleted, among the SNS IDs stored in the content information management unit 106 in association with the shared content ID associated with the specified shared content. Here, the content is compared using the image information relating to the content and the information attached to or associated with the content.

Note that the shared content information gathering control unit 101 may gather the shared content from the servers of the SNSs by associating the shared content IDs managed by the servers of the SNSs with the shared content. In this case, the shared content information gathering control unit 101 can specify the shared content stored in the content information management unit 106 that corresponds to the received (deleted) shared content simply by comparing the shared content IDs.

In this example, the shared content information gathering control unit 101 compares the content, but the content may be compared by the content information connection unit 105.

With respect to content from which the SNS ID has been deleted, the deleted SNS ID corresponds to the SNS from which the content was deleted, and therefore the SNS ID that corresponds to the SNS from which the content was deleted is not associated with the deleted content likewise in the content information received by the content information display control unit 113 according to the fifth embodiment from the content information access control unit 107. Therefore, when the content 307 shown in FIG. 6 is deleted from the server 21 of the first SNS, for example, the sharing mark 213 is not displayed in the upper right corner, as shown in FIG. 17, and instead, the content 307 is displayed on the display with only the terminal mark 214 displayed in the lower left corner.

In the fifth embodiment, as described above, the sharing mark is not displayed on the display in association with content that has been deleted from a sharing service. Therefore, when the user views the content displayed on the display, the user can easily confirm that the content has been deleted from the sharing service.

Note that in the fifth embodiment, when shared content is deleted from an SNS, the corresponding SNS ID is deleted from the content information management unit 106, but instead of deleting the SNS ID, the SNS ID may be managed as history information indicating that the shared content has been deleted from the SNS. In this case, for example, the content information display control unit 113 receives content information including the history information from the content information access control unit 107, and performs control to display the sharing mark 213 corresponding to the SNS from which the content has been deleted in a translucent condition or the like on the display.

Furthermore, in the fifth embodiment, when shared content is deleted from an SNS, the corresponding SNS ID is deleted from the content information management unit 106, but instead, the deleted shared content or the content information corresponding to the deleted shared content may be deleted from the content information management unit 106.

Sixth Embodiment

In the first embodiment, the sharing mark 213 and the terminal mark 214 are displayed in association with the terminal content, but in the sixth embodiment, the terminal mark 214 is not displayed in association with the terminal content, and instead, only the sharing mark 213 is displayed in association with the terminal content.

Figure 18:
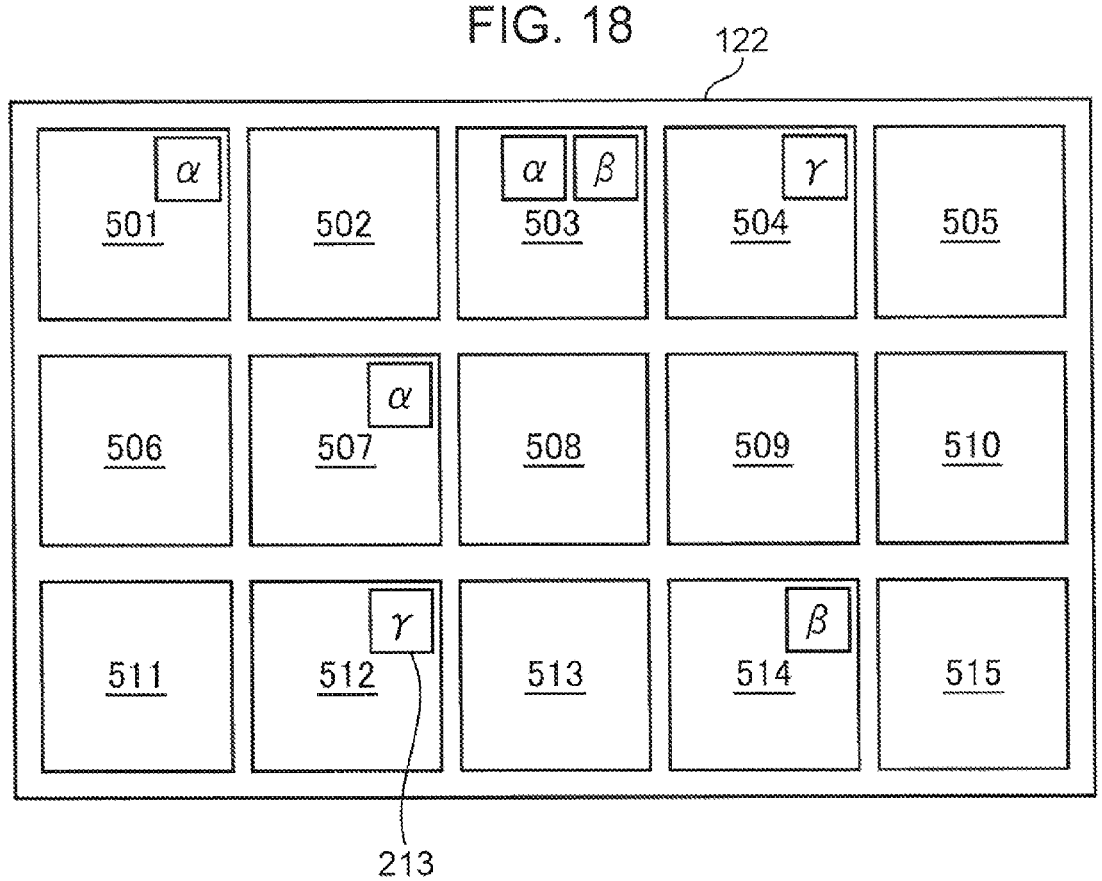
FIG. 18 is a schematic view showing an example of a display of content information according to a sixth embodiment.

FIG. 18 is a schematic view showing an example of a display of content information according to the sixth embodiment. In the sixth embodiment, identical elements to the first embodiment have been allocated identical reference numerals, and detailed description thereof has been omitted. Function blocks of a server and a terminal according to the sixth embodiment are similar to those of the first embodiment, shown in FIG. 1. A content display control system according to the sixth embodiment is configured similarly to that of the first embodiment, shown in FIG. 2. The sixth embodiment will be described below while focusing on differences with the first embodiment.

The shared content information gathering control unit 101 obtains shared content shared on a sharing service from the sharing service using the user authentication information employed by the user to share content on the sharing service. The shared content information gathering control unit 101 stores the obtained shared content in the content information management unit 106 in association with the sharing service identification information identifying the sharing service. Further, the content information display control unit 113 performs control to display the terminal content stored on the terminal owned by the user on the display. The content information display control unit 113 obtains the sharing service identification information associated with the shared content from the content information management unit 106 via the content information access control unit 107, and performs control to display the sharing service identification information on the display in association with the terminal content that is associated with the shared content, among the terminal content displayed on the display.

Here, an operation performed to display the terminal content according to the sixth embodiment will be described. Note that the operation to display the terminal content according to the sixth embodiment will be described using the flowchart of the first embodiment, shown in FIG. 8.

Processing of steps S11, S12, and S13 according to the sixth embodiment is identical to the first embodiment.

Next, in step S14, the content information access control unit 107 accesses the content information management unit 106, receives the obtainable content information from the content information management unit 106, and transmits the received content information to the content information display control unit 113 of the application 110. Here, the content information access control unit 107 accesses the content information in sequence using the terminal content ID as a reference, for example, in order to receive, from the content information management unit 106, content information in which the subject terminal content ID and the SNS ID associated with the shared content ID that is associated with the subject terminal content ID are associated with each other. The content information access control unit 107 then transmits the received content information to the content information display control unit 113.

Next, in step S15, the content information display control unit 113 of the application 110 receives the content information transmitted by the content information access control unit 107 provided in the server 10. Here, using the terminal ID as a reference, for example, the content information display control unit 113 receives, from the content information access control unit 107, content information in which the subject terminal content ID and the SNS ID associated with the shared content ID that is associated with the subject terminal content ID are associated with each other. Next, in step S16, the content information display control unit 113 performs control on the basis of the received content information to display information representing the SNS ID on the display in association with the terminal content, whereupon the procedure is terminated.

In FIG. 18, the content information display control unit 113 performs control to display content 501 to 515 on the display. The sharing mark 213 is displayed in the upper right corners of a part of the content 501 to 505. The sharing mark 213 depicting "α", which is displayed on the content 501, 503, and 507, represents the first SNS, for example. The sharing mark 213 depicting "β", which is displayed on the content 503 and 514, represents the second SNS, for example. The sharing mark 213 depicting "γ", which is displayed on the content 504 and 312, represents the third SNS, for example.

In the sixth embodiment, as described above, the content information access control unit 107 displays the sharing mark 213 on the display in association with content that has been shared on an SNS (a sharing service), among the content displayed on the display, to indicate the SNS on which the content has been shared. Therefore, when the user views the displayed content, the user can easily identify the content that has been shared by him/herself on the SNS, among the displayed content, as well as the sharing service on which the content has been shared, from the sharing mark 213.

Other Embodiments (1) In the first to sixth embodiments, the server 10 may include the user information setting unit 111, content information forwarding unit 112, and content information display control unit 113 serving as constituent elements of the application 110. In this case, the various information is exchanged between the terminal and the server via a browser installed in the terminal.

(2) In the first to sixth embodiments, the functions of the server 10 may be included in one of the plurality of terminals 11, 12, 13. For example, the first terminal 11 may include the shared content information gathering control unit 101, user information management unit 102, user information authentication control unit 103, terminal content information gathering control unit 104, content information connection unit 105, content information management unit 106, and content information access control unit 107 serving as the constituent elements of the server 10 shown in FIG. 1. In this case, the second terminal 12 and the third terminal 13 access the first terminal 11 in order to exchange various information with the first terminal 11. Likewise with this configuration, similar functions and operations to those of the first to sixth embodiments can be realized.

(3) In the first to sixth embodiments, the displays of the terminals have a touch panel function on which operations performed by the user are received, for example. However, the displays of the terminals need not have a touch panel function as long as the respective terminals have a function with which to receive operations performed by the user, such as a combination of a touchpad and an Enter button, or a mouse, for example.

(4) Needless to mention, the content display control system 1 including the server 10 and the terminals 11 to 13 may be configured to include all of the functions of the first to sixth embodiments.

(5) The terminal content may be a static image, a moving image, or music.

INDUSTRIAL APPLICABILITY

The content display method, program, and content display system according to the present invention may be used as a content display method, a program, and a content display system with which to realize a function, a service, or the like for favorably displaying content stored on a terminal by a user and content shared on a sharing service among the content stored in the terminal.

The invention claimed is:

1. A content display method comprising:
    a first display step of displaying on a display unit terminal content stored in a storage terminal owned by a user;
    a second display step of displaying sharing service identification information, which is information identifying a sharing service used to share content, on said display unit in association with shared content, which is content that has been shared on said sharing service among said terminal content displayed on said display unit;
    a third display step of displaying terminal identification information, which is information identifying said storage terminal, on said display unit in association with said terminal content displayed on said display unit;

a sharing information storage step of obtaining said shared content from said sharing service using authentication information employed by said user to use said sharing service, and storing said obtained shared content in a storage unit in association with said sharing service identification information; and a connection step of creating sharing match information expressing a matching relationship between (a) terminal content that matches said shared content, among said terminal content displayed on said display unit, and (b) the shared content that matches terminal content, and storing said created sharing match information in said storage unit, wherein, in said second display step, said terminal content that matches said shared content is specified on the basis of said sharing match information, and said sharing service identification information is displayed on said display unit in association with said specified terminal content.

2. The content display method according to claim 1, further comprising a terminal information storage step of obtaining said terminal content from said storage terminal and storing said obtained terminal content in said storage unit in association with said terminal identification information, wherein, when said shared content is stored in said storage unit in said sharing information storage step, shared content identification information specifying said shared content is attached to said shared content, and said attached shared content identification information is stored in said storage unit in association with said sharing service identification information, when said terminal content is stored in said storage unit in said terminal information storage step, terminal content identification information specifying said terminal content is attached to said terminal content, and said attached terminal content identification information is stored in said storage unit in association with said terminal identification information, and in said connection step, a matching shared content correspondence table, on which said terminal content identification information attached to said terminal content is associated with said shared content identification information attached to said shared content that matches said terminal content, is created as said sharing match information.

3. The content display method according to claim 2, in said terminal information storage step, when said terminal content is obtained from a first terminal serving as said storage terminal, said obtained terminal content is stored in said storage unit in association with first terminal identification information identifying said first terminal, and when said terminal content is obtained from a second terminal serving as said storage terminal, said second terminal being different to said first terminal, said obtained terminal content is stored in said storage unit in association with second terminal identification information identifying said second terminal, in said connection step, terminal match information expressing a matching relationship of matching terminal content between said terminal content stored in said storage unit in association with said first terminal identification information and said terminal content stored in said storage unit in association with said second terminal identification information is also created, whereupon said created terminal match information is stored in said storage unit, and in said third display step, said matching terminal content is specified on the basis of said terminal match information, whereupon said first terminal identification information and said second terminal identification information are displayed on said display unit in association with said specified terminal content.

4. The content display method according to claim 3, in said third display step, information stored in said storage unit latterly, among said first terminal identification information and said second terminal identification information, is displayed on said display unit in a larger size than information stored in said storage unit initially.

5. The content display method according to claim 3, when said terminal content is stored in said storage unit in said terminal information storage step, terminal content identification information specifying said terminal content is attached to said terminal content, whereupon said attached terminal content identification information is stored in said storage unit in association with said terminal identification information, and in said connection step, a matching terminal content correspondence table associating said terminal content identification information attached to said matching terminal content is created as said terminal match information.

6. The content display method according to claim 2, in said terminal information storage step, when said terminal content is obtained from a first terminal serving as said storage terminal, said obtained terminal content is stored in said storage unit in association with first terminal identification information identifying said first terminal, and when said terminal content is obtained from a second terminal serving as said storage terminal, said second terminal being different to said first terminal, said obtained terminal content is stored in said storage unit in association with second terminal identification information identifying said second terminal, in said connection step, terminal match information expressing a matching relationship of matching terminal content between said terminal content stored in said storage unit in association with said first terminal identification information and said terminal content stored in said storage unit in association with said second terminal identification information is also created, whereupon said created terminal match information is stored in said storage unit, and in said third display step, said matching terminal content is specified on the basis of said terminal match information, whereupon information stored in said storage unit latterly, among said first terminal identification information and said second terminal identification information, is displayed on said display unit in association with said specified terminal content.

7. The content display method according to claim 2, when said terminal content is stored in said storage unit in said terminal information storage step, terminal content identification information specifying said terminal content is attached to said terminal content, said attached terminal content identification information is stored in said storage unit in association with said terminal identification information, and in a case where said terminal content is deleted from said storage terminal from which said terminal content has been obtained, said terminal identification information stored in said storage unit in association with said terminal content identification information is deleted from said storage unit, and in said third display step, said deleted terminal identification information is not displayed on said display unit in association with said terminal content corresponding to said terminal content identification information that is stored in said storage unit in association with said deleted terminal identification information.

8. The content display method according to claim 2, when said shared content is stored in said storage unit in said sharing information storage step, shared content identification information specifying said shared content is attached to said shared content, said attached shared content identification information is stored in said storage unit in association with said sharing service identification information, and in a case where said shared content is deleted from said sharing service from which said shared content has been obtained, said sharing service identification information stored in said storage unit in association with said shared content identification information is deleted from said storage unit, and in said second display step, said deleted sharing service identification information is not displayed on said display unit in association with said shared content corresponding to said shared content identification information that is stored in said storage unit in association with said deleted sharing service identification information.

9. The content display method according to claim 1, when said shared content is obtained from said sharing service in said sharing information storage step, evaluation information representing an evaluation applied to said shared content is also obtained from said sharing service, whereupon said obtained evaluation information is stored in said storage unit in association with said obtained shared content, and in said first display step, said shared content is displayed on said display unit on the basis of said evaluation information such that said shared content having a high evaluation is displayed in a larger size than said shared content having a low evaluation.

10. A content display method comprising:
a first display step of displaying on a display unit terminal content stored in a storage terminal owned by a user;
a sharing information storage step of obtaining shared content, which is content among said terminal content displayed on said display unit that has been shared on a sharing service used to share content, from said sharing service using authentication information employed by said user to use said sharing service, and storing said obtained shared content in a storage unit in association with sharing service identification information identifying said sharing service;
a second display step of displaying said sharing service identification information on said display unit in association with said shared content among said terminal content displayed on said display unit;
a connection step of creating sharing match information expressing a matching relationship between (a) terminal content that matches said shared content, among said terminal content displayed on said display unit, and (b) the shared content that matches terminal content, and storing said created sharing match information in said storage unit,
wherein, in said second display step, said terminal content that matches said shared content is specified on the basis of said sharing match information, and said sharing service identification information is displayed on said display unit in association with said specified terminal content.

11. A nontransitory computer readable recording medium storing a program for controlling a content display system having a display unit, said program causes a computer of said content display system to execute:
a first display step of displaying on said display unit terminal content stored in a storage terminal owned by a user;
a second display step of displaying sharing service identification information, which is information identifying a sharing service used to share content, on said display unit in association with shared content, which is content that has been shared on said sharing service among said terminal content displayed on said display unit;
a third display step of displaying terminal identification information, which is information identifying said storage terminal, on said display unit in association with said terminal content displayed on said display unit;
a sharing information storage step of obtaining said shared content from said sharing service using authentication information employed by said user to use said sharing service, and storing said obtained shared content in a storage unit in association with said sharing service identification information; and
a connection step of creating sharing match information expressing a matching relationship between (a) terminal content that matches said shared content, among said terminal content displayed on said display unit, and (b) the shared content that matches terminal content, and storing said created sharing match information in said storage unit,
wherein, in said second display step, said terminal content that matches said shared content is specified on the basis of said sharing match information, and said sharing service identification information is displayed on said display unit in association with said specified terminal content.

12. A content display system comprising:
a storage terminal owned by a user;
a display unit;
a control unit, executed by a computer, for displaying on said display unit terminal content stored in said storage terminal; and
a storage unit,
wherein said control unit is further configured to:
display sharing service identification information, which is information identifying a sharing service used to share content, on said display unit in association with shared content, which is content that has been shared on said sharing service among said terminal content displayed on said display unit;
display terminal identification information, which is information identifying said storage terminal, on said display unit in association with said terminal content displayed on said display unit;
obtain said shared content from said sharing service using authentication information employed by said user to use said sharing service, and store said obtained shared content in a storage unit in association with said sharing service identification information;
create sharing match information expressing a matching relationship between (a) terminal content that matches said shared content, among said terminal content displayed on said display unit, and (b) the shared content that matches terminal content, and store said created sharing match information in said storage unit,
specify said terminal content that matches said shared content on the basis of said sharing match information, and display said sharing service identification information on said display unit in association with said specified terminal content.

* * * * *